US006519509B1

(12) United States Patent
Nierlich et al.

(10) Patent No.: US 6,519,509 B1
(45) Date of Patent: Feb. 11, 2003

(54) SYSTEM AND METHOD FOR MONITORING AND CONTROLLING ENERGY DISTRIBUTION

(75) Inventors: Gerd W. Nierlich, Evanston, IL (US); James Ronan Heffernan, Wesley Chapel, FL (US)

(73) Assignee: Stonewater Software, Inc., Evanston, IL (US)

( * ) Notice: Subject to any disclaimer, the term of this patent is extended or adjusted under 35 U.S.C. 154(b) by 264 days.

(21) Appl. No.: 09/602,071

(22) Filed: Jun. 22, 2000

(51) Int. Cl.$^7$ ............................................... G05D 11/00
(52) U.S. Cl. ...................................... 700/286; 700/295
(58) Field of Search ................................. 700/286, 291, 700/297, 293, 295

(56) References Cited

U.S. PATENT DOCUMENTS

| | | | |
|---|---|---|---|
| 4,589,075 A | 5/1986 | Buennagel | 700/286 |
| 4,608,560 A | 8/1986 | Allgood | 340/825.52 |
| 4,804,938 A | 2/1989 | Rouse et al. | 700/249 |
| 4,833,618 A | 5/1989 | Verma et al. | 702/62 |
| 4,847,781 A | 7/1989 | Brown, III et al. | 700/296 |
| 5,436,510 A * | 7/1995 | Gilbert | 307/38 |
| 5,502,339 A | 3/1996 | Hartig | 560/78 |
| 5,541,589 A | 7/1996 | Delaney | 340/870 |
| 5,572,438 A | 11/1996 | Ehlers et al. | 700/297 |
| 5,576,700 A | 11/1996 | Davis et al. | 340/13.31 |
| 5,640,153 A | 6/1997 | Hildebrand et al. | 340/7.1 |
| 5,706,191 A | 1/1998 | Bassett et al. | 700/297 |
| 5,861,683 A | 1/1999 | Engel et al. | 307/38 |
| 5,924,486 A | 7/1999 | Ehlers et al. | 165/238 |
| 5,930,773 A | 7/1999 | Crooks et al. | 705/36 |
| 5,949,974 A | 9/1999 | Ewing et al. | 709/202 |
| 5,962,989 A | 10/1999 | Baker | 700/249 |
| 6,029,092 A | 2/2000 | Stein | 700/11 |
| 6,167,389 A * | 12/2000 | Davis et al. | 700/11 |

OTHER PUBLICATIONS

"E–Commerce Infogrid", The Reddy Corporation International; A Scientech Inc., Company, pp. 1–7, No date.
"Alliant plans to protect summer reliability", Megawatt-Daily, Mar. 21, 2000, p. 6.
"Down to the Nitty Gritty: Technical Experts Tackle New Metering Needs", Electric Utility Week, Jan. 3, 2000, p. 14.
Gregory M. Lander, "Conquering Communications Obstacles", Energy Markets, pp. 45–47, Mar. 2000.
"Cal–ISO asks customers to bid load shedding", Megawatt-Daily, Mar. 13, 2000, pp. 1, 7.
"Study highlights regional shortages, gluts", Megawatt-Daily, Mar. 10, 2000, pp. 1, 7.
"Provider Offers Energy Information System", Advanced Control Systems, Jan./Feb. 2000, p. 21.
"Summer package heats up to $66 at Palo", PriceHedgingReport (Megawatt Daily), Mar. 10, 2000, p. 6.

(List continued on next page.)

Primary Examiner—Maria N. Von Buhr
Assistant Examiner—Kidest Bahta
(74) Attorney, Agent, or Firm—Brinks Hofer Gilson & Lione

(57) ABSTRACT

Systems that monitor and control energy distribution manage energy distribution or use for Energy Service Providers and end-users. A system includes a publicly or privately accessible distributed network, a network access device, and a management device. The network access device communicates with the management device through the distributed network to control loads at a remote location. The method of monitoring and controlling energy distribution receives data at an on-line Site, processes an application program that evaluates load and market supply data, and initiates power curtailment requests or power curtailment events.

13 Claims, 21 Drawing Sheets

Microfiche Appendix Included
(2 Microfiche, 168 Pages)

OTHER PUBLICATIONS

"Utilities urged to embrace Internet", MegawattDaily, Mar. 13, 2000, p. 2.

Paragraphs from America Online: JLWHITEJLW, Mar. 21, 2000, pp. 2–3.

Dwight Allen, "Going virtual: Utilities and the e–business revolution", Industry Report on e–business, Electric Light & Power, Feb. 2000, pp. 17–18.

Richard Nemec, "Special Report: Metering", Energy Decisions, Jun. 1998, pp. 10–13.

Barbara L. Vergetis Lundin, "Information Management Bandwagon", Energy Decisions, Mar. 1999, pp. 1–5.

Niala Boodhoo, "A shopping list: what to know", Crain's Chicago Business, Apr. 5, 1999.

Barbara L. Vergetis Lundin, "Submeters Refine Electric Load Profiles", Energy Decisions, Mar. 1999, pp. 1–7.

"Part Two: Your Electricity Needs", Building Owners and Managers Association International, pp. 25 and 29, No date.

"Chapter 8: 'Value Added' Services", Building Owners and Managers Association International, p. 4, No date.

"Checklist 1: Tips to Reduce Your Energy Costs Today", Building Owners and Managers Association International, p. 75, No date.

Martha Russis, Internet World Summer 99, "Shock Treatment", Crain's Chicago Business, Apr. 5, 1999, pp. 1–4.

Lisa Bertagnoli, Internet World Summer 99, "Powerful introduction to providers", Crain's Chicago Business, Apr. 5, 1999, pp. 1–4.

Jane Adler, Internet World Summer 99, "Web site reviews: where to spend energy, with dereg near", Crain's Chicago Business, Apr. 5, 1999, 1 page.

Blaise Zerega, "Putting Energy into Exchanges", Red Herring, Nov. 1999, pp. 170 and 172.

John Markoff, "The Next Big Leap? It's Called XML", The New York Times, Jun. 7, 2000.

"Smart Options", Energy Decisions Online, 222.facilities-net.com, Jun. 5, 2000, pp. 1–4.

* cited by examiner

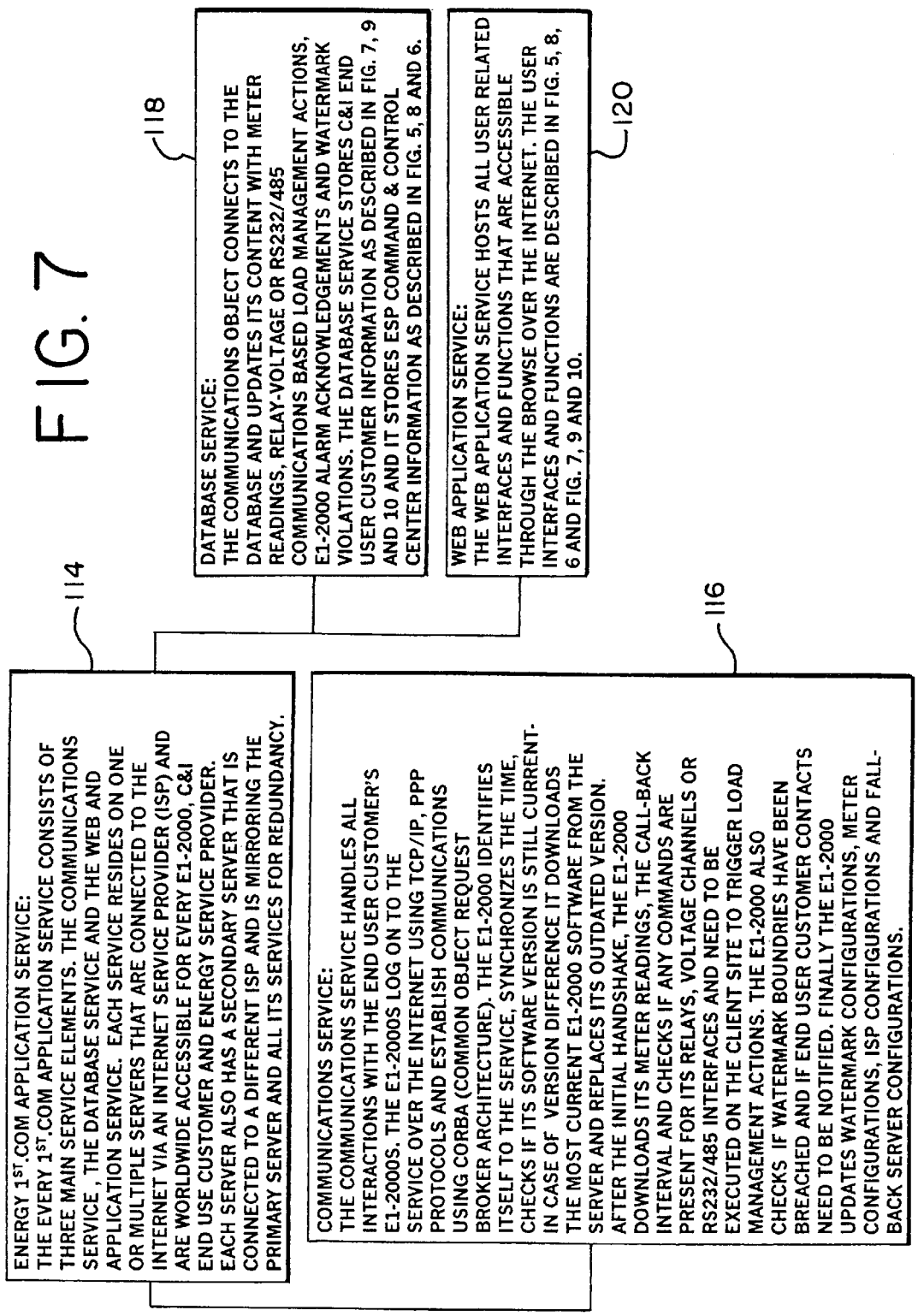

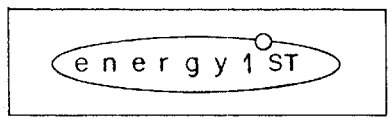

FIG.8

WHAT DO YOU WANT TO DO?

○ ENERGY INFO

○ RATE ANALYSIS

○ MANAGE LOAD

○ MODIFY SETUP

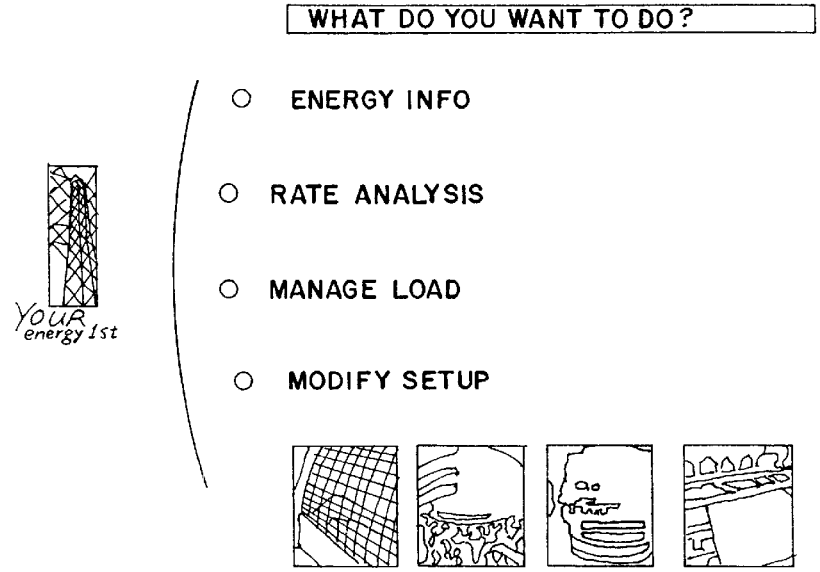

FIG.9

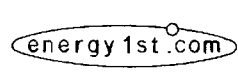

ENERGY INFORMATION | ENERGY RATE ANALYSIS | STONEWATER SOFTWARE          (?)

MAIN  CONTACTS LOAD REDUCTION FORECAST CURTAILMENT HISTORY ICCM CONFIGURATION

ACCOUNTS ▷
GROUPS          124 ⟋ ACCOUNTS [CARTON CRAFT PRINTING ▽]  [DELETE]
CURTAILMENT
HISTORY              NAME [CARTON CRAFT PRINTING]
              ACCOUNT # [100]
              ADDRESS 1 [500 N. HOUGH STREET]
              ADDRESS 2 [                    ]
              CITY [BARRINGTON]   STATE [IL]   ZIP [60010]
              [SAVE]

FIG. 10 energy1st.com

ENERGY INFORMATION | ENERGY RATE ANALYSIS | STONEWATER SOFTWARE 

ADD NOTIFICATIONS  UPDATE NOTIFICATIONS

MAIN

ACCOUNTS  ACCOUNT NAME    ADDRESS

GROUPS    CARTON CRAFT PRINTING ▾  500 N. HOUGH STREET BARRINGTON, IL 60010

CURTAILMENT  CONTACTS  GERD NIERLICH ▾  DELETE

HISTORY

BACK      CONTACT NAME GERD NIERLICH

PRIMARY? ☑

PAGER GERD-PAGER@STONEWATERSOFTWARE.COM —126
          PAGER GERD-PALM@STONEWATERSOFTWARE.COM —128
          EMAIL GERD@STONEWATERSOFTWARE.COM —130
          FAX 847-864-1238 —132

SAVE

FIG.11

ENERGY INFORMATION | ENERGY RATE ANALYSIS | STONEWATER SOFTWARE

MAIN  ACCOUNT NAME  ADDRESS

ACCOUNTS▷ [CARTON CRAFT PRINTING ▷]  500 N. HOUGH STREET BARRINGTON, IL 60010

GROUPS

CURTAILMENT       134      136      138           140              142          144           146
HISTORY     148  ACTIVE?  KW  TRIGGER      NOTIFICATION   DAYS         HOURS/DAY   TRIGGER
            CLICK TO UPDATE  REDUCTION METHOD  LEAD TIME   AVAILABLE                PRICE
                                              (MIN)        FOR SEASON              $/MWH

GENERATOR    ✓    500        ○           15              ○            ○            ○
HVAC         ✓     20        ○            5              ○            ○            ○
LIGHTING     ✓     50        ○           15              ○            ○            ○

TOTAL: 570      MAX: 15

[ADD NEW ITEM]

energy1st.com

FIG. 12

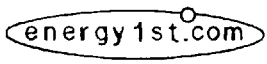

ENERGY INFORMATION  ENERGY RATE ANALYSIS  STONEWATER SOFTWARE

MAIN  
ACCOUNTS ▷  
GROUPS  
CURTAILMENT  
HISTORY

ACCOUNT NAME  
CARTON CRAFT PRINTING

ADDRESS  
500 N. HOUGH STREET  
BARRINGTON, IL 60010

ICCM [CARTON CRAFT ICCM ▼]

150 — ITEM [GENERATOR]  
152 — KW REDUCTION [500]  
154 — TRIGGER PRICE ($/MWH) [0]  
156 — DAYS/YEAR [0]  
158 — HOURS/DAY [0]  
160 — NOTIFICATION LEAD TIME (MIN) [15]  
162 — ACTIVATE RELAY ⊙ [   ▼] [OFF▼] MILLISECONDS  
164 — ACTIVATE VOLTAGE ○ [   ▼] [0 ▼] STEP  
166 — DEACTIVATE RELAY ⊙ [   ▼] [OFF▼] MILLISECONDS  
168 — DEACTIVATE VOLTAGE ○ [   ▼] [0 ▼] STEP

[SAVE]

(energy1st.com)

FIG.13

LOAD MANAGEMENT & CURTAILMENT ENERGY RATE ANALYSIS STONEWATER SOFTWARE

MAIN
ACCOUNTS
GROUPS
CURTAILMENT
HISTORY

CUSTOMER FORECAST

CUSTOMER [SELECT A CUSTOMER]
DATE [05/17/2000]
[SAVE]

| HOUR | KW DATA |
|------|---------|
| 1 | 350.94 |
| 2 | 347.82 |
| 3 | 347.04 |
| 4 | 346.38 |
| 5 | 358.32 |
| 6 | 411.36 |
| 7 | 460.2 |
| 8 | 478.74 |
| 9 | 475.74 |
| 10 | 470.64 |
| 11 | 471.42 |
| 12 | 458.58 |
| 13 | 461.64 |
| 14 | 493.68 |
| 15 | 482.46 |
| 16 | 469.8 |
| 17 | 424.38 |
| 18 | 412.08 |
| 19 | 413.76 |
| 20 | 406.5 |
| 21 | 360.36 |
| 22 | 347.52 |
| 23 | 332.58 |
| 24 | |

FIG.14

ENERGY INFORMATION | ENERGY RATE ANALYSIS | STONEWATER SOFTWARE

| | CURTAILMENT DATE /170 | NOTIFICATION MESSAGE /172 | MW COMMITTED /174 | DATE & TIME NOTIFIED /176 | FROM-TO /178 | ACTION /180 |
|---|---|---|---|---|---|---|
| MAIN ACCOUNTS GROUPS CURTAILMENT HISTORY▷ | 4/13/2000 | VIEW MESSAGE | 2 | 04/07/2000 11:00:00 AM | 10:30:00 – 02:00:00 | ACCEPT |
| | 4/07/2000 | VIEW MESSAGE | | 04/07/2000 09:00:00 AM | 11:00:00 – 04:00:00 | REJECT |
| | 4/02/2000 | VIEW MESSAGE | | 04/01/2000 04:30:00 PM | 08:30:00 – 02:00:00 | NO RESPONSE | energy1st.com

FIG. 15

ICCM DETAILS:

- 182 — OWNER — HVAC
- 184 — NAME — NEW YORK1 ICCM
- 186 — ZONEID — 83
- 188 — AREA CODE
- 190 — PRE-DIAL
- 192 — TELEPHONE NUMBER
- 194 — PASSWORD — NULLPASSWD
- 196 — MAC ADDR — 00:C0:6C:73:94:08
- 198 — COMMO(MINUTES) — 10
- 200 — TEMP COMMO(MINUTES) — 10
- 204 — DESCRIPTION — TEST NEW YORK DEVICE

206 {
- SAVE ICCM INFO
- SEE RECENT COMMO
- TEST NOTIFICATION
}

THESE ARE THE METERS:

| EDIT (208) | ZONEID (210) | ALIAS (212) | TYPE (214) | MULTIPLIER (216) | POLL(MINUTES) (218) | SPECIAL* |
|---|---|---|---|---|---|---|
| ⦿ | 84 | CHANNEL 0 | NEWYORKPULSE1 | 1.000000 | 10 | 0 |
| ○ | 85 | CHANNEL 1 | NEWYORKPULSE1 | 1.000000 | 10 | 1 |
| ○ | 86 | CHANNEL 2 | NEWYORKPULSE1 | 1.000000 | 10 | 2 |
| ○ | 87 | CHANNEL 3 | NEWYORKPULSE1 | 1.000000 | 10 | 3 |
| ○ | 88 | CHANNEL 4 | NEWYORKPULSE1 | 1.000000 | 10 | 4 |
| ○ | 89 | CHANNEL 5 | NEWYORKPULSE1 | 1.000000 | 10 | 5 |
| ○ | 90 | CHANNEL 6 | NEWYORKPULSE1 | 1.000000 | 10 | 6 |
| ○ | 91 | CHANNEL 7 | NEWYORKPULSE1 | 1.000000 | 10 | 7 |

EDIT SELECTED METER

*THE SPECIAL METER PARAMETERS ARE SPECIFIC TO THE KIND OF METER/ ACCUMULATOR INVOLVED. FOR EXAMPLE: THE NEWYORKPULSE1 METER TAKES A SINGLE NUMBER (0-7) TO SPECIFY THE ACCUMULATOR CHANNEL FOR THE METER.

FIG. 16

| LOG FOR ZONE 83 ~220 | ~224 ~226 |
|---|---|
| 05/12/2000 11:44:23.00 CDT | HWLOGIN |
| 05/12/2000 11:44:23.00 CDT | FIRST PASS |
| 05/12/2000 10:37:40.00 CDT | HWLOGIN |
| 05/12/2000 10:37:40.00 CDT | FIRST PASS |
| 05/11/2000 13:37:46.00 CDT | HWLOGIN |
| 05/11/2000 13:37:46.00 CDT | FIRST PASS |
| 05/11/2000 13:28:35.00 CDT | HWLOGIN |
| 05/11/2000 13:17:20.00 CDT | HWLOGIN |
| 05/11/2000 13:06:05.00 CDT | HWLOGIN |
| 05/11/2000 12:54:49.00 CDT | HWLOGIN |
| 05/11/2000 12:43:28.00 CDT | HWLOGIN |
| 05/11/2000 12:32:11.00 CDT | HWLOGIN |
| 05/11/2000 12:07:19.00 CDT | HWLOGIN |
| 05/11/2000 11:56:02.00 CDT | HWLOGIN |
| 05/11/2000 11:44:50.00 CDT | HWLOGIN |
| 05/11/2000 11:33:35.00 CDT | HWLOGIN |
| 05/11/2000 11:22:15.00 CDT | HWLOGIN |
| 05/11/2000 10:57:50.00 CDT | HWLOGIN |
| 05/11/2000 10:46:35.00 CDT | HWLOGIN |
| 05/11/2000 10:35:14.00 CDT | HWLOGIN |
| 05/11/2000 10:35:14.00 CDT | PPP LINK FAILED |
| 05/11/2000 10:20:54.00 CDT | HWLOGIN |
| 05/11/2000 10:20:54.00 CDT | PPP LINK FAILED |
| 05/11/2000 09:56:30.00 CDT | HW LOGIN |
| 05/11/2000 09:45:10.00 CDT | HW LOGIN |
| 05/11/2000 09:40:40.00 CDT | HW LOGIN |
| 05/11/2000 09:29:30.00 CDT | HW LOGIN |
| 05/11/2000 09:18:17.00 CDT | HW LOGIN |
| 05/11/2000 09:07:06.00 CDT | HW LOGIN |
| 05/11/2000 08:55:53.00 CDT | HW LOGIN |
| 05/11/2000 08:44:37.00 CDT | HWLOGIN |
| 05/11/2000 08:33:23.00 CDT | HW LOGIN |
| 05/11/2000 08:22:11.00 CDT | HW LOGIN |
| 05/11/2000 08:09:57.00 CDT | HW LOGIN |
| 05/11/2000 07:58:47.00 CDT | HW LOGIN |
| 05/11/2000 07:47:37.00 CDT | HW LOGIN |

FIG. 17

210 — ALIAS — CHANNEL 0
212 — TYPE — NEWYORKPULSE I ▽
214 — MULTIPLIER — 1.000000
216 — POLL(MINUTES) — 10
SPECIAL — 0

206 {
- SAVE METER CONFIGURATION
- VIEW RECENT READINGS
- EDIT WATERMARKS
}

FIG. 18

| RULE # | TYPE | LIMIT | ACTIVE | SUSPECT |
|---|---|---|---|---|
| \multicolumn{5}{l}{WATERMARKS FOR ZONE 84} | | | | |
| 0 | NONE ▽ | 0 | ☐ | ☐ |
| 0 | NONE ▽ | 0 | ☐ | ☐ |
| 0 | NONE ▽ | 0 | ☐ | ☐ |
| 0 | NONE ▽ | 0 | ☐ | ☐ |

SAVE CHANGES

236 — (header label)
228 — RULE #
230 — LIMIT
232 — ACTIVE
234 — SUSPECT

RECENT WATERMARK VIOLATION (~80)

| RULE # | TIMESTAMP | KW | NOTIFIED |
|---|---|---|---|
| 236 | 238 | 240 | 242 |

FIG.20 energy1st.com

ENERGY INFORMATION | ENERGY RATE ANALYSIS | STONEWATER SOFTWARE

CURTAILMENT AUTHENTICATION

MAIN
ACCOUNTS    NAME: [_____]
GROUPS
CURTAILMENT    PASSWORD [_____]
HISTORY
            [LOGIN]

FIG.21 energy1st.com

ENERGY INFORMATION | ENERGY RATE ANALYSIS | STONEWATER SOFTWARE

MAIN
ACCOUNTS    SORT BY [NAME ▾] — 262
GROUPS
CURTAILMENT    SELECT THE GROUP OR GROUPS YOU WANT TO CURTAIL
HISTORY

GROUP NAME — 264   ORIGINAL MW   AVAILABLE MW — 266   MIN LEAD TIME — 268   LEAST AVAILABLE DURATION — 270

☑ CARTON CRAFT PRINTING

☑ COMMERCIAL

☐ HOSPITALS

[NEXT]

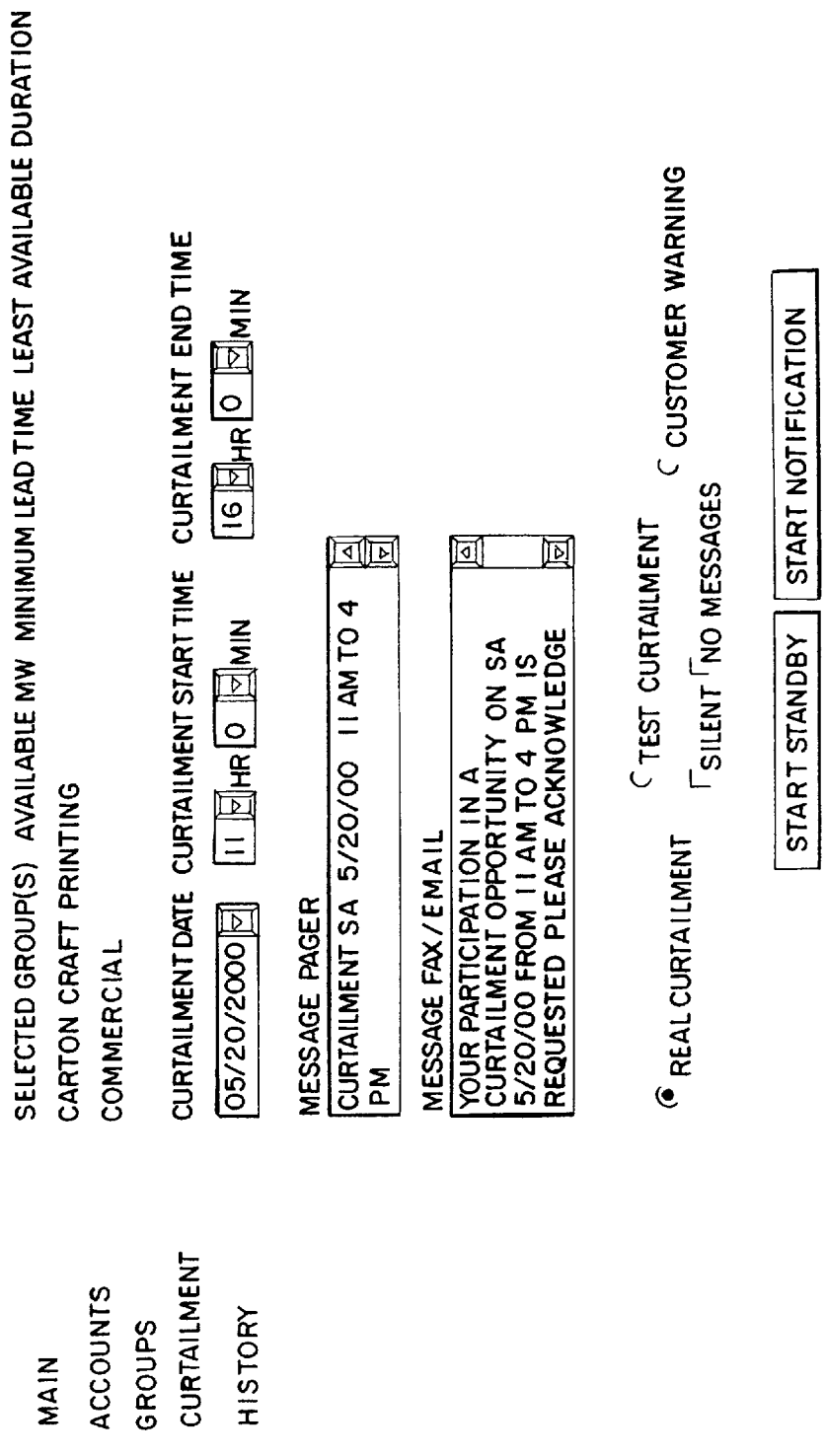

SYSTEM AND METHOD FOR MONITORING AND CONTROLLING ENERGY DISTRIBUTION

MICROFICHE APPENDIX

Microfiche Appendix of the presently preferred source code is attached and comprises two (2) sheets having a total of 168 frames (98 on frame 1 and 70 on frame two). The Microfiche Appendix contains material that is subject to copyright protection. The copyright owner has no objection to the facsimile reproduction of the Microfiche Appendix as it appears in the Patent and Trademark Office patent files or records, but otherwise reserves all copyright rights whatsoever.

BACKGROUND

1. Technical Field

The present invention relates to a system and a method that manages energy use, and in particular, to a system and a method that monitors energy use and energy supplies using either a public or a private distributed network to initiate curtailment requests and disconnect dispensable loads from energy supplies or activate end-user generators.

2. Description of Related Art

New supplies of electricity will be needed as demand for electricity grows. To meet this demand, local and regional utilities are evaluating many different strategies from the building of thermal (steam-generated), water powered, fossil fuel, and nuclear generators to the pooling of unutilized electric capacity. In pooling systems, utilities join together in a grid system to share and distribute unutilized electric capacity through open market allocations. These systems offer great opportunities for economic gain as electric demand can be met without substantial investments in new power plants. However, these systems also have risks. Grid systems can breakdown when demand exceeds supply, which can affect large numbers of end users. To protect against power failures, end-users must also improve end-use efficiency.

One means of achieving a sustainable supply of electric power in the future is to use efficient end-use technologies. Energy efficiency programs that focused only on appliances, power plants, and equipment in the past now need to pursue other avenues of technology that increase the availability of energy and improve supply and end-user efficiency. New technologies must be found to meet customer, generator, supplier, network operator, regulator, and environmental policy maker objectives.

Another means of achieving a sustainable supply of electric power is to create competitive electric markets driven by demand side bidding. The goal of demand side bidding is to reduce the demand for energy through efficient load utilization and efficient energy distribution.

Demand side bidding offsets the need for increased generation through demand reduction. The system treats an offer from an end-user to reduce demand as an offer to sell generated electricity. The energy not consumed by an end-user is considered "generated" as it is available to meet other demand. There can be contractual incentives for end-users to switch dispensable loads off-line during periods of high demand. End-users, for example, might receive payments for "generating" electricity they do not consume. In practice, such a system has not met expectations as it requires an accessible system that integrates open market price exchanges with advanced technology.

BRIEF DESCRIPTION OF THE DRAWINGS

FIG. 7 is a block diagram of an on-line Site of FIG. 1.

FIG. 8 is an exemplary start-page of the on-line Site of FIG. 1.

FIG. 9 is an exemplary address dialog-box of FIG. 1.

FIG. 10 is an exemplary contact dialog-box of FIG. 1.

FIG. 11 is an exemplary load summary dialog-box of FIG. 1.

FIG. 12 is an exemplary option dialog-box of FIG. 1.

FIG. 13 is an exemplary forecast dialog box of FIG. 1.

FIG. 14 is an exemplary communication summary of FIG. 1.

FIG. 15 is an exemplary Energy1st-2000 dialog-box of FIG. 1 illustrating a HVAC interface assigned to an exemplary zone and exemplary meter summaries.

FIG. 16 is an exemplary log of the exemplary zone of FIG. 15.

FIG. 17 is an exemplary Energy1st-2000 dialog box of FIG. I assigned to an exemplary zone.

FIG. 18 is an exemplary Watermark dialog-box of the exemplary zone of FIG. 17.

FIG. 20 is an exemplary start-page dialog box of the curtailment system of FIG. 1.

FIG. 21 is an exemplary application function of FIG. 20.

FIG. 22 is an exemplary message initiation and automated load management function of FIG. 20.

In the drawings, the same reference numbers through several views designate the same or similar elements.

DETAILED DESCRIPTION

The system and method of the present invention overcomes many barriers to a successful demand side bidding program by integrating open market energy price exchanges with advanced communication, database, and curtailment technologies. The system and method of the invention provides complete access to real-time load profiles and load control data and provides end-users, such as end-user customers, and energy supply providers with manual, automatic, and hybrid control of load reduction processes that optimize energy distribution and energy use. Energy supply providers include energy marketers, grid owners, utilities, merchant plant proprietors, cooperatives, and municipalities.

Figure 1:
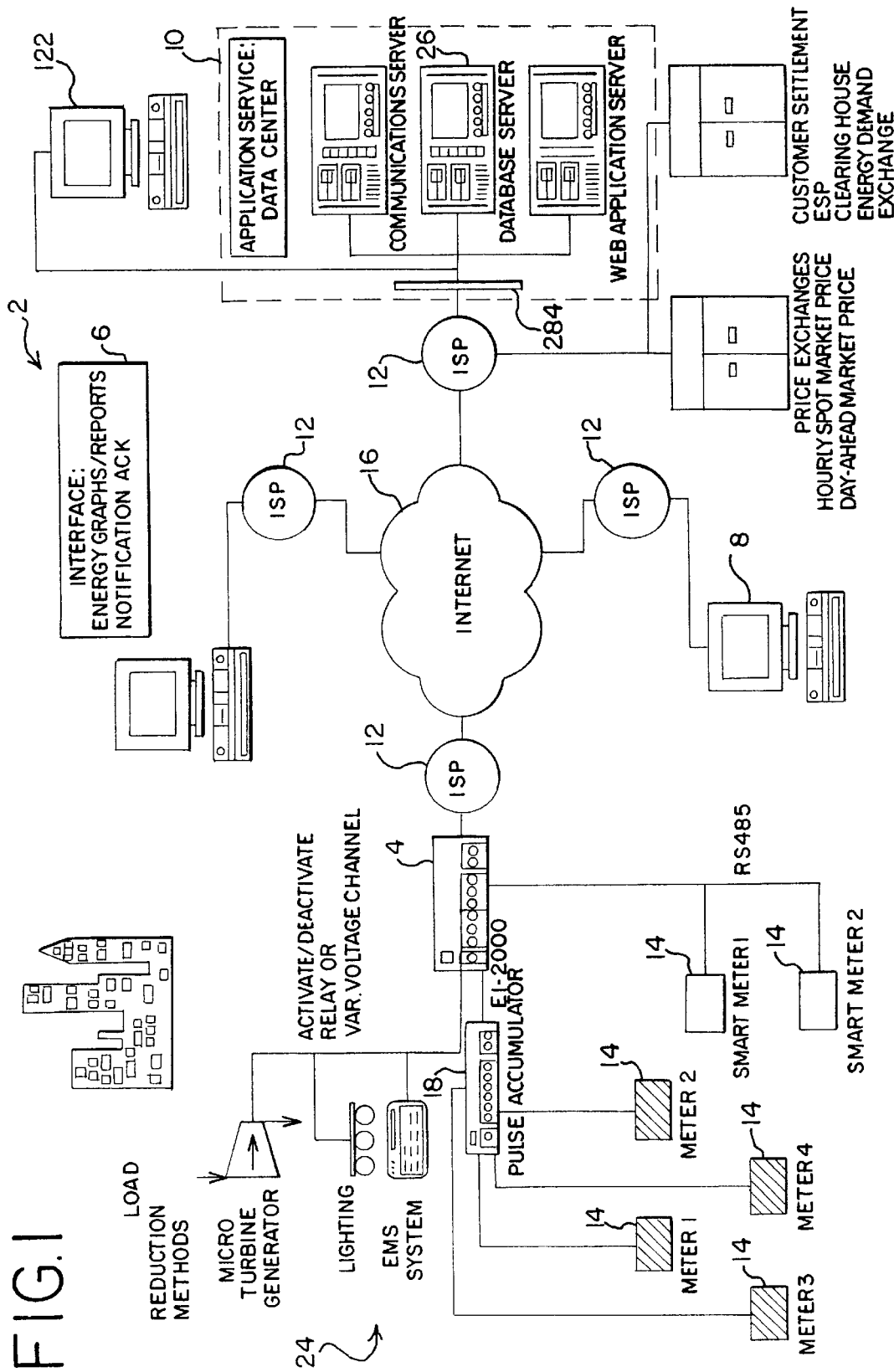
FIG. 1 is a block diagram of a first embodiment of the invention.

FIG. 1 illustrates a block diagram of a preferred embodiment of the invention. The system 2 preferably comprises a network access device such as an Energy1st-2000 ("E1-

2000") 4, a customer or end-user interface 6, an Energy Service Provider ("ESP") interface 8, and a management device 10. The network access device, customer or end-user interface 6, ESP interface 8, and management device 10 are preferably joined together by gateways linked together by a publicly accessible or a privately accessible distributed network. The gateways perform protocol conversions, data translations, data conversions, and message handling.

Preferably, an access provider, such as an Internet Service Provider ("ISP") 12, provides network connectivity services to the network access device, the customer or end-user interface 6, the ESP interface 8, and the management device 10. Connectivity can be provided in many ways. One way allows devices to dial up the access provider through a modem. A modem, which is any device that converts data from one form to another, uses landlines or wireless transceivers to access remote devices. Connectivity can also be achieved through dedicated lines such as T1 carriers. T1 carriers are private lines or leased lines unlike the public lines or switched lines used in standard dial-up telephone connections. T1 carriers provide high bandwidths that can transmit large blocks of text and image data. A third means of connectivity uses set-top boxes that uses communication and signal-routing technology to access publicly accessible networks, such as the Internet 16 through coaxial, fiber optic, twisted pair, or other types of cable.

A network access device is a controller and its supporting interfaces that coordinates communication and control between power monitoring circuitry, power curtailment circuitry, and a distributed network. A preferred embodiment of a network access device is an E1-2000 4 that links power monitoring circuitry 14, power curtailment circuitry, and a management device 10 through a publicly accessible distributed network such as the Internet 16, for example. An E1-2000 4 accepts structured input; processes it according to a set of prescribed rules, and produces outputs. Some outputs are sent to the management device 10 through the ISP 12.

In the preferred embodiment, the E1-2000 4 comprises a processor, a non-volatile or FLASH memory, two RS-232-C asynchronous serial communication ports, one RS-232-C/RS-485 asynchronous serial communication port, a modem, a Local Area Network ("LAN") device, such as an Ethernet device or LAN that utilizes Carrier Senses with Multiple Access Collision Detection ("CSMAICD") protocol to regulate communication line traffic, three relay controlled ("digital") and two analog voltage channels, an eight channel pulse accumulator device, a push button-switch card with an interface, a visual ("a light") and/or auditory ("piezoelectric transducer") alarm and a 60W/110V power supply.

The E1-2000 4 operates under the control of a processor that provides a platform to execute application programs. The non-volatile or Flash memory stores code and data on a temporary ("volatile") and on a permanent ("non-volatile") basis. Unlike some non-volatile memory that is erased and programmed in bytes, the FLASH memory is erased and programmed in blocks and in some preferred embodiments can interface five volt, three volt, and two volt system buses. In one preferred embodiment, the FLASH memory performs reading and programming operations simultaneously.

Preferably, two RS-232-C asynchronous serial communication ports provide point-to-point serial communication between peripheral devices. The RS-232-C/RS-485 serial communication port allows multiple meters, pulse accumulators 18, device control and building control systems, counters, and displays to be connected to the same RS-232-C/RS-485 line in parallel. Because each of these devices has its own unique digital address, the RS-232-C/RS-485 port can support up to 254 digital addresses that allows multiple devices to be addressed and transmit on the same communication line. An internal modem and Ethernet device allows the E1-2000 4 to communicate with an access provider such as an ISP 12 or other network nodes at a prescribed programmable frequency of seconds, minutes, weeks, months or other desired time increments. The modem and Ethernet device can communicate to devices dispersed across local or distant areas.

Preferably, three relay controlled voltage channels or digital channels and two analog voltage channels interface external devices such as dispensable loads or generators. The three relay controlled and two analog voltage channels can control power generators and/or Heating Ventilation and Air Controllers ("HVAC"), lighting controls, motors, boilers, and cooler loads and/or other facility control systems, for example.

The E1-2000 4 acquires data, in part, through one or more external pulse accumulator devices 18 with firmware that gives it independent decision-making ability. The pulse accumulator devices 18 track pulse frequency and aggregate the number of pulses generated by power monitoring circuitry such as a power meter 14 through eight separate electrically isolated channels. In one preferred power monitoring circuit, the frequency of the output pulses is proportional to the instantaneous power tracked by the power monitoring circuit and the aggregate pulse count is proportional to the total watt-hours tracked by the power monitoring circuit 14. In alternative preferred embodiments, the pulse accumulator device 18 is integrated within the E1-2000 4.

Figure 2:
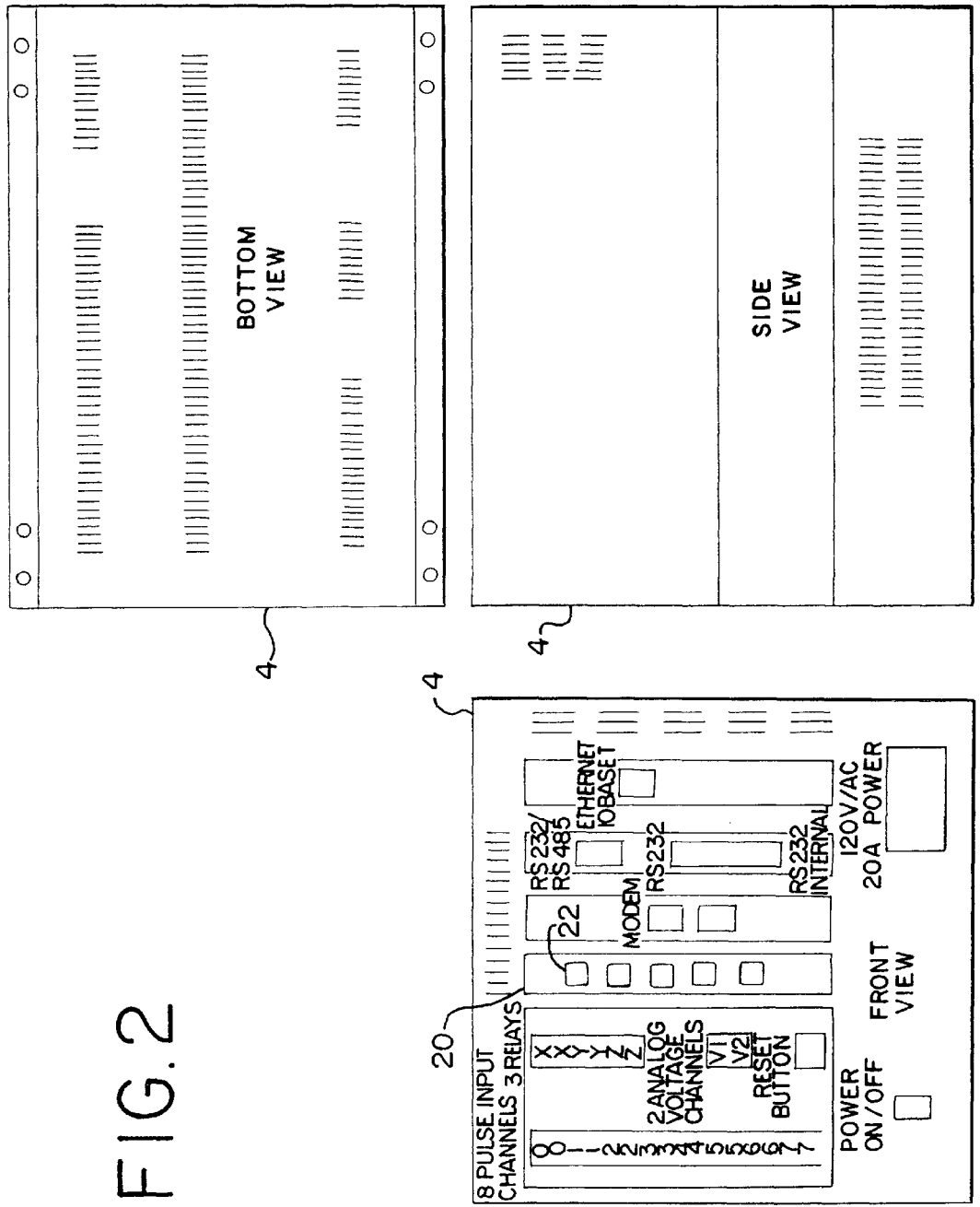
FIG. 2 is a block diagram of an Internet Customer Curtailment Module device of FIG. 1.

The push button-switch card 20 partially illustrated in FIG. 2 includes a plurality of manually actuated programmable switches 22. In the preferred embodiment, one programmable switch 22 is programmed to initiate a connection between the E1-2000 4 and the management device 10 while a second programmable switch 22 is programmed to reset the E1-2000 4. The push-button switch card 20 can also comprise multi-functional switches such as programmable switches 22 that initiate connections between the E1-2000 4 and the management device 10 when actuating a first state and reset the E1-2000 4 when actuating a second state. another preferred feature of the push button-switch card 20 includes providing a programmable switch 22 that actuates multiple states of the E1-2000 4 according to the time interval the switch is actuated.

Preferably, the E1-2000 processor controls the visual and/or the auditory E1-2000 alarm(s). In the preferred embodiment, when the E1-2000 4 receives a curtailment notification an auditory alarm is actuated for a timed interval that is preferably acknowledged through a push button-switch 22 or deactivated by a lapse of time.

As part of the E1-2000 4 installation process, an E1-2000 4 is electrically connected to the end-user's meters 14. Often, end-users utilize one of three types of meters 14. These meters are standard pulse meters, which include time of day kilowatt hour relay meters that can be outfitted with a pulse relay board, pulse meters with internal pulse accumulating circuitry, and smart meters. Standard pulse meters generate output pulses that are proportional to the instantaneous power delivered to a load. A single E1-2000 4 can preferably read up to eight standard pulse meters. Each of the standard meters is connected to the E1-2000 4 through the accumulator device 18 that tracks the frequency of the output pulses and aggregates or counts the meter pulse outputs. The pulse accumulator device 18 comprises a user-defined multiplier circuit that calculates the precise quantity of energy delivered to a load. Because pulse meters with internal pulse accumulating circuitry have RS-232-C ports, these meters are directly connected to the E1-2000 4, bypassing the accumulator device 18. Similarly, smart meters have RS-485 ports that directly connect to the E1-2000 4. While the E1-2000 4 is capable of interfacing any combination of these meters, its multiple Institute of Electrical and Electronic Engineering ("IEEE") standard interfaces allows the E1-2000 4 to interface many other types of devices or combination of meters and peripheral devices. Moreover, when expansion boards are used, alternative E1-2000 4 embodiments and accumulator devices 18 can interface more than eight standard meters.

Preferably, the E1-2000 4 connects to a publicly accessible or a privately accessible distributed network through a modem or a LAN such as an Ethernet device. The Operating System and Application Software are stored in FLASH memory. Preferably, volatile memory such as Random Access Memory ("RAM") stores operating data that is uploaded to the management device 10. However, to compensate for blackouts, brownouts, and power surges, RAM with power supply backup, non-volatile memory such as Electrical Programmable Read-only Memories ("EPROM"), and/or Flash memory is used to store operating data in alternative preferred embodiments to protect and maintain data integrity.

Once the E1-2000 4 is properly installed, it initially connects to the management device 10 through a publicly accessible distributed network, such as the Internet 16. All E1-2000s 4 preferably share a common access provider username and password, which allows each E1-2000 4 to connect to the distributed network through a common global access account.

Upon connectivity, the E1-2000 4 identifies itself and identifies its current Application Software version. If the management device 10, which also supports an on-line Site, determines that the Application Software is outdated, the management device 10 downloads a new version of the Application Software before continuing its initialization routine. The E1-2000 4 uses its remote upgrade capability to seamlessly update Application Software when needed.

Preferably, the E1-2000 4 synchronizes its internal clock with the system clock of the management device 10 after it validates its Application Software. Synchronization allows the management device 10 to track load profiles and curtailment events in real-time. The E1-2000 4 then compares the date and time ("timestamp") of its Configuration File with the configuration timestamp stored in management device memory. If the Configuration File attributes differ from the stored attributes, the. E1-2000 4 downloads an updated Configuration File that preferably includes the E1-2000 callback frequency, its meter designations, its pulse accumulator device identity, its meter multiplier coefficients, its meter polling frequency, and its Watermark boundaries assigned to each meter the E1-2000 4 supports. All expired data in memory is then flushed before logging off of the management device 10 and disconnecting from the ISP 12.

Once the E1-2000 4 is initialized, preferably the E1-2000 4 connects to the ISP 12 in response to a number of events. The E1-20004 connects to the ISP 12 at its scheduled callback intervals, when a Watermark violation occurs, or when initiated by a ring instruction. The scheduled callback intervals establish a standard schedule of connections between the E1-2000 4 and the management device 10. In this event, the E1-2000 4 automatically connects to the management device 10 at programmed intervals at which time the E1-2000 4 uploads all of its meter and operating data to the management device.

A Watermark is a user-defined characteristic, operation, or condition that causes the E1-2000 4 to automatically interface the management device 10 regardless of the E1-2000's 4 callback schedule. Preferably, when a Watermark violation occurs, the E1-2000 4 immediately connects to the management device 10 through the ISP 12. In the preferred embodiment, Watermark violations occur when energy usage is (1) greater than ("HI") a user-defined limit, or (2) less than ("LO") a user-defined limit, or (3) equal to ("EQ") a user-defined limit, or (4) less than a user-defined limit BUT not equal to zero ("LONZ"). Preferably, the E1-2000 4 compares meter data or peripheral data to its user designated Watermarks each time a meter, accumulator device, or any other device is polled, however, in alternative embodiments the E1-2000 4 can be programmed to continuously monitor the status of one or more devices and compare the status of these devices with their prescribed Watermarks to detect Watermark violations in real-time.

Preferably, all communication between the E1-2000 4 and the management device 10 is initiated by the E1-20004. If the E1-2000 modem is called, the E1-2000 modem will not receive the incoming call. In response to any incoming call, the E1-2000 4 automatically contacts the management device 10 when a communication line is available (the incoming call initiates a "ring instruction"). The E1-2000's 4 call protocol prevents the E1-2000 4 from communicating directly with unauthorized computers or devices and vice versa which protects the E1-2000 4 against external threats and access from unauthorized users such hackers. All communication to the E1-2000 4 is routed through the management device 10 or the LAN. Thus, it is the management device 10 or the LAN that decides whether it is safe to allow a message, a program parameter, a file, or other data to pass to the E1-2000 device 4. Because LAN based E1-2000's 4 exist behind end-user Firewalls, these E1-2000s 4 are protected by the Firewall security of the end-user's network as well.

When the E1-2000 4 connects to an ISP 12 it cycles through a programmed routine. The E1-2000 4 first identifies itself through a unique code, which is a string of characters. The management device 10 compares the code against a stored list of authorized codes. If the code is validated, the management device 10 allows the E1-2000 4 access. The E1-20004 then validates its Application Software and synchronizes its internal clock with the system clock of the management device 10. After its clock is synchronized, the E1-2000 4 uploads each of its individual meter or device readings, which are validated by the management device 10 and then stored in a database. If any Watermark violations occurred since the last E1-2000 4 interface, these violations are uploaded, validated, and entered in the database. The E1-2000 4 next downloads its callback connection schedule and then validates its Configuration File. If any curtailment instructions were entered at the on-line Site or sent directly to the management device 10 by the ESP, the E1-2000 4 downloads curtailment notification instructions before clearing expired or uploaded data, logging off of the management device 10, and disconnecting from the ISP 12.

The E1-2000 4 receives a set of instructions from the management device 10 when it is selected by an ESP to curtail energy consumption. These instructions can include defining its callback intervals, actuating a visual and/or audible alarm, and controlling the analog and relay controlled ("digital") voltage channels. Preferably, the management device 10 will instruct the E1-2000 4 to shorten its callback frequency or maintain a continuous connection with the management device 10 which allows end-users and ESPs to receive real-time or near real-time measurements of end-user's energy consumption. During a curtailment period, a visual and/or audible alarm can provide notice to an end-user that an E1-2000 4 is operating under a curtailment notice. If a push-button switch 22 -is used to deactivate the alarm, the E1-2000 4 can automatically interface the management device 10 and record the time and frequency the push-button switch 22 was actuated in a database and thus track each time a curtailment notice was acknowledged.

Because the analog and relay controlled voltage channels are preferably connected to the end-user's control systems 24, the management device 10 through the E1-2000 4 can directly control user's loads such as air conditioners, lights, pumps, etc., for example, and generators at the ESP's or end-user's direction. The management device 10 can instruct one or multiple analog voltage channels of the E1-2000 4 to produce a range of voltage levels. In the preferred embodiment, two analog voltage channels produce a continuous voltage that range between 0.95 volts and 2.6 volts. To ensure that the analog voltage channels will interface and control many end-user internal or external control systems, loads, and generators, the E1-2000 4 can be incremented through one hundred different steps within this voltage range. Other low, medium, and high voltage ranges as designated by the IEEE Standards Board (LB 100A—Apr. 23, 1975) are used in alternative preferred embodiments to control low, medium, or high voltage systems.

Similarly, the management device 10 can instruct one or more of the relay controlled voltage channels of the E1-2000 4 to generate digital signals of varying pulse widths. In the preferred embodiment, the relay-controlled channels are capable of switching between two voltage states at rates that range between 20 and 90 millisecond intervals. Other pulse width ranges are possible in alternative preferred embodiments. The relays generate digital signals that can interface end-user's controls 24 and allows relatively low power signals to control high-powered devices. Either analog or relay controlled voltage channels can control many combinations of loads, generators, and end-user control systems 24. Their individual or combined use depends on the end-user's facilities and/or the end-user's and ESP's system objectives.

Other notable features of the E1-2000 4 includes (1) the ability of the E1-2000 4 to connect to an access provider such as an ISP 12 through either a LAN or a modem if either device is inoperable; (2) the ability of the E1-2000 4 to connect to an access provider such as a conventional or low-Earth-orbit satellite provider through wireless transceivers; (3) the ability of the E1-2000 4 to access multiple ISP 12 access numbers if one or more of the numbers are in use or are not available; (4) the ability of the E1-2000 4 to access multiple secondary servers supporting the management device 10 if the primary server fails or is inoperable through a LAN or a modem connection; and (5) the E1-2000's 4 use of the LINUX™ operating system, although other operating systems such as WINDOWS™, UNIX™, or operating systems used in SUN™ workstations or in APPLE™ machines can be used in alternative preferred embodiments.

Figure 3:
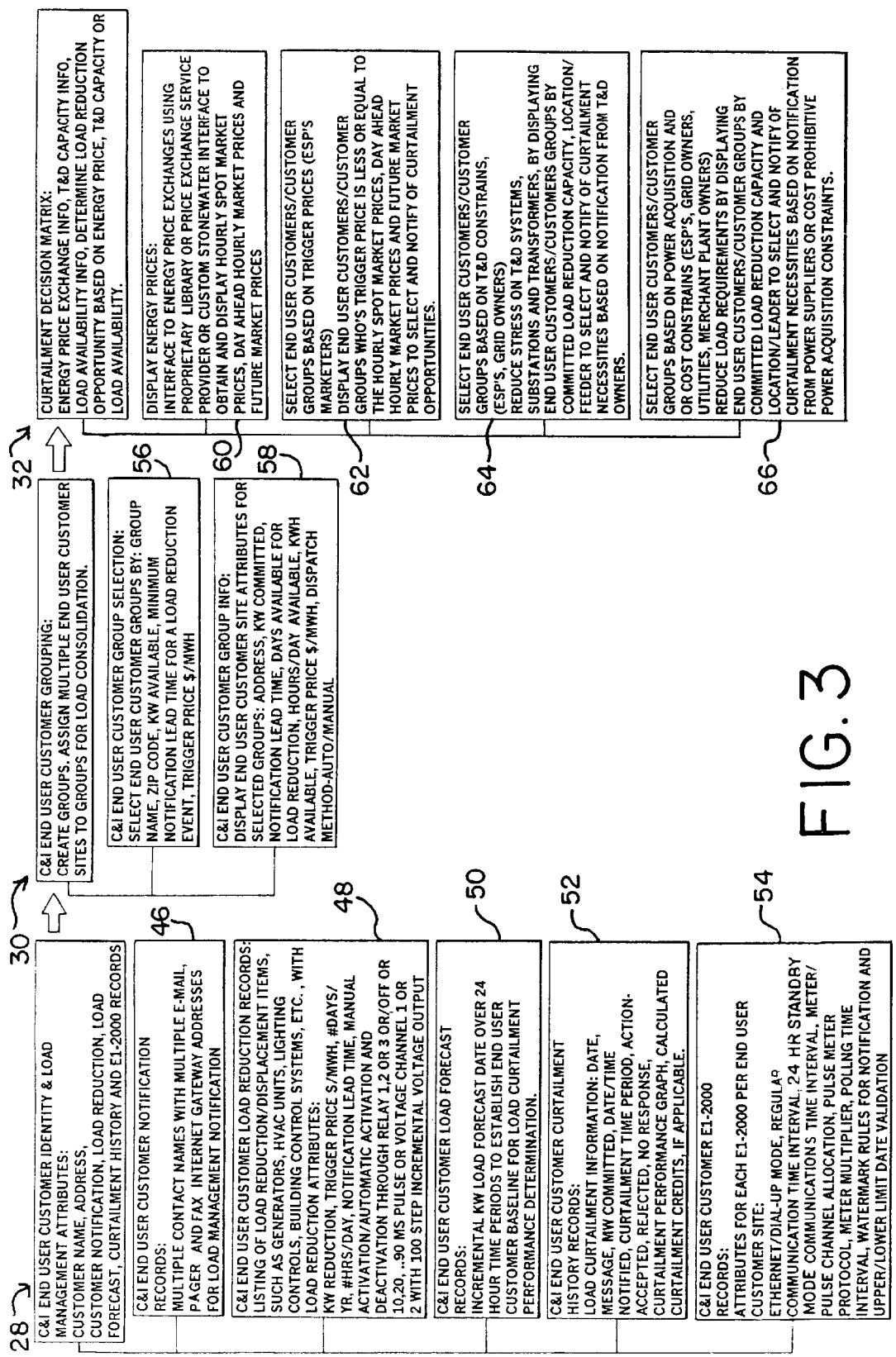
FIG. 3 is a block diagram of a Command and Control Center of FIG. 1.
Figure 4:
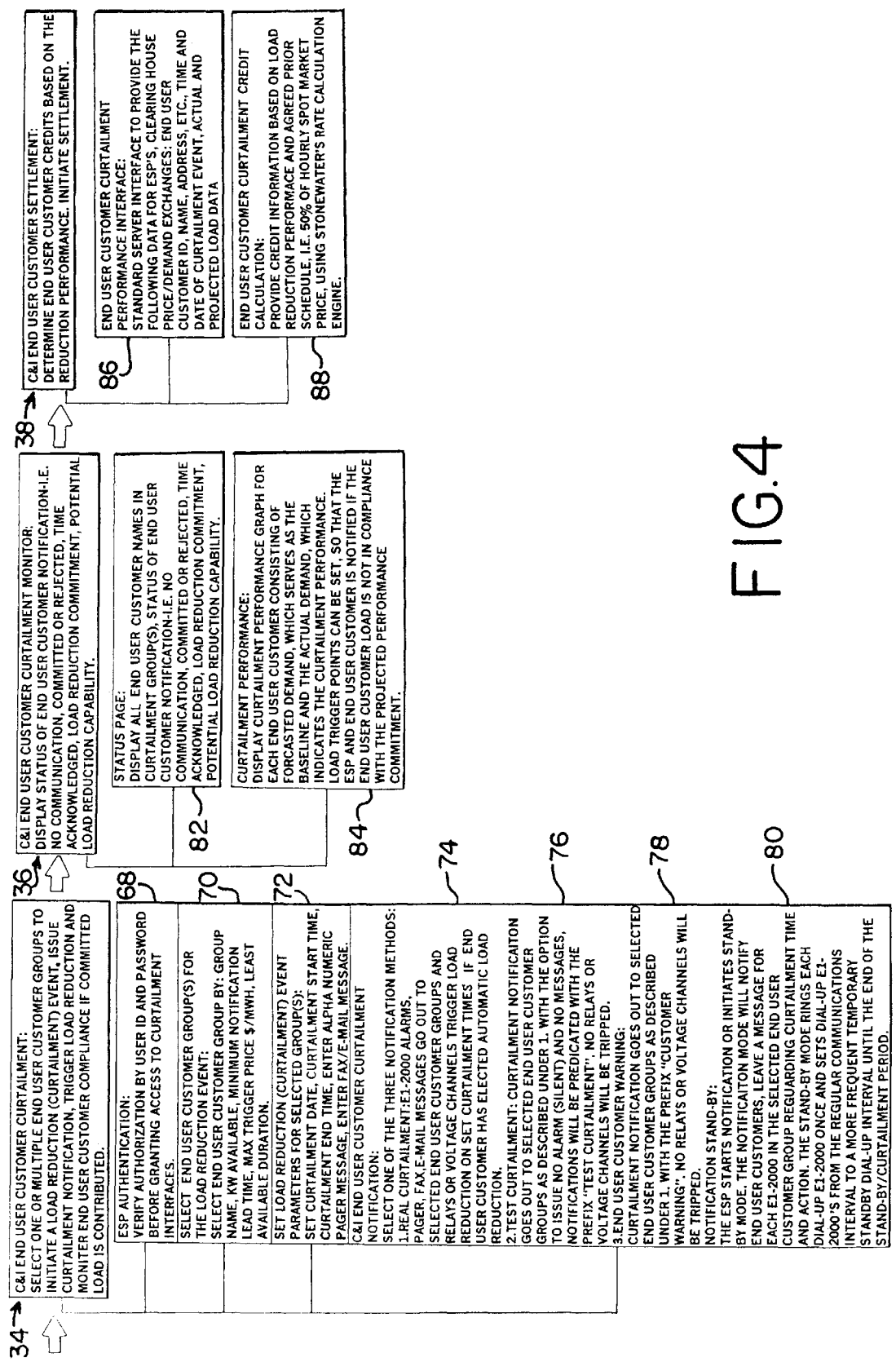
FIG. 4 is a block diagram of the Command and Control Center of FIG. 1.
Figure 5:
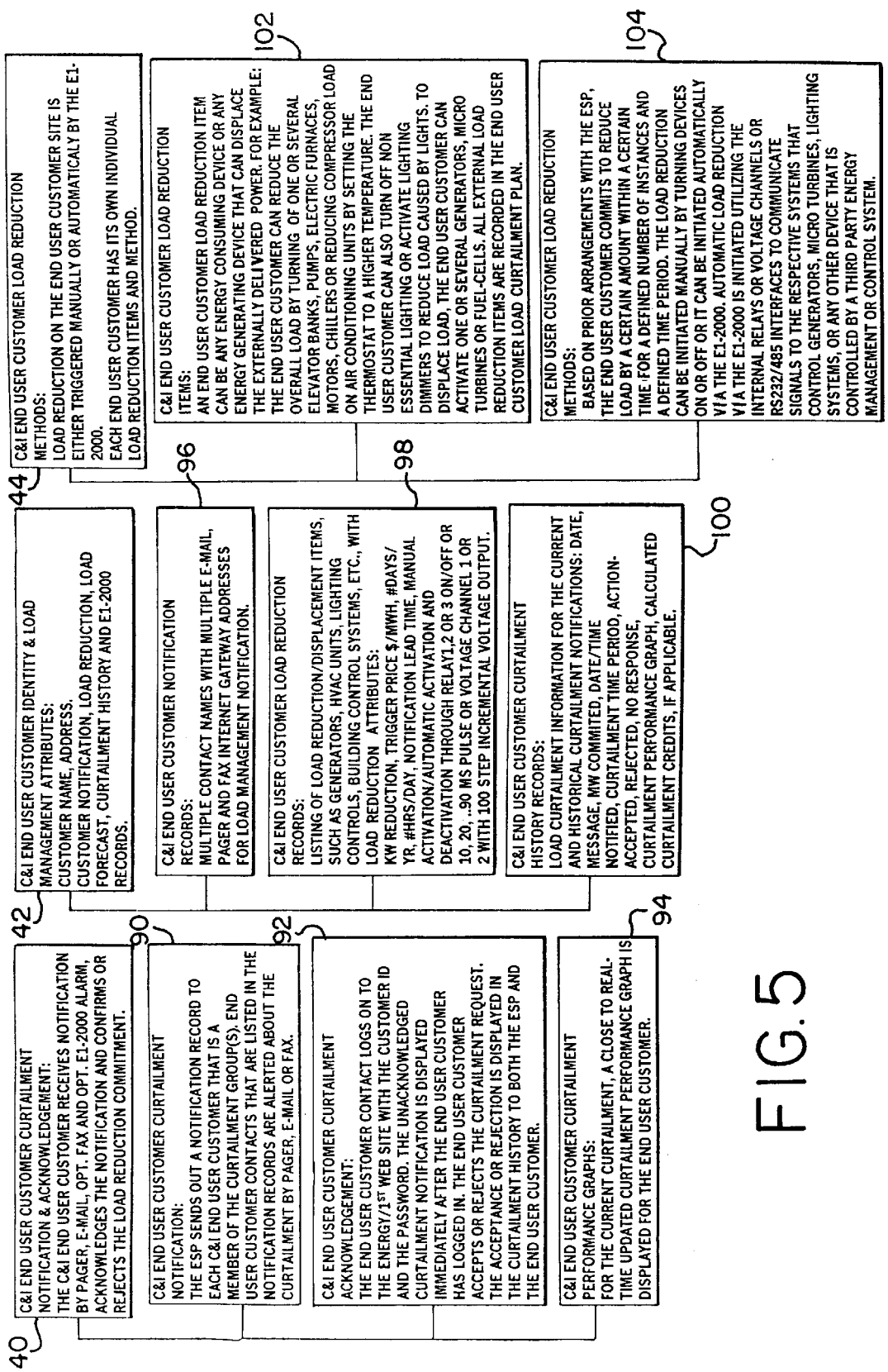
FIG. 5 is a block diagram of the Command and Control Center of FIG. 1.

Referring to the drawings, and particularly FIGS. 3-5, block diagrams illustrate the structural, sequential, or functional relationships of the Command and Control Center ("CCC") 26 (shown in FIG. 1) that interfaces and supports the management device 10. The CCC 26 comprises end-user records 28, end-user groupings 30, a curtailment decision matrix 32, a curtailment module 34, a curtailment monitor 36, a settlement module 38, notification records 40, load management records 42, and load reduction methods 44. These records and modules reside within a database, memory, or a management system. In the preferred embodiment, the database is a relational database that includes Object Link Embedding ("OLE") that stores information in tables—rows and columns of data and conducts searches by using data in specified rows or columns. The rows of the table represent records (a collection of information about separate items) and the columns represent fields (particular attributes of a record).

As shown in FIG. 3, the CCC 26 maintains records describing an end-user's identity 28, notification records 46, load reduction records 48, load-forecast records 50, curtailment history 52, and E1-2000 4 records 54. The end-user's identity records 28 include the end-user's name and address. The end-users name is simply a field that distinguishes one entity from another. The customer notification records 46 include records of contacts, email, Internet, network, and facsimile addressees. These records are referenced when the management device 10 notifies end-users of market prices, when notifying end-users of curtailment events, or when other trigger action events occur.

Preferably, the load reduction records 48 include information on an end-user's displaceable loads, load reduction systems and controls, and generating devices. In the preferred embodiment, a record of load reduction/displacement items includes data that identifies end-user's generators, HVAC units, lighting control units, building control systems used to control other devices, and other items. Preferably, the load reduction records 48 also includes attributes such as (1) the level of kilowatt reduction; (2) the trigger price at which a decision to displace a load, activate a generator, or contact a control system occurs; (3) the number of days, years, and hours within a day a load can be switched off-line, a generator can be activated, or a controller contacted; (4) the notification lead time needed before a curtailment event can occur; and (5) whether the load, generator, or control system is manually or automatically activated or deactivated.

Preferably, the load-forecast records 50 provide incremental and aggregate load forecast data over a prescribed period that include data that can be automatically imported into the CCC 26 and is fully compatible with other electronic devices and software such as devices and software that graphically illustrate variables using histograms and plots and/or perform statistical analysis. This feature is useful for anticipating demand peaks and curtailment scheduling. In the preferred embodiment, the load-forecast records 50 include the incremental kilowatt load forecast data over twenty four-hour periods, which are used to calculate end-user baselines for load curtailment performance analysis.

The curtailment records 52 preferably include load curtailment information such as the date of the curtailment event, the message(s) sent to the designated end-user contact, the amount of electrical power to be curtailed, the date and time the end-user contact was notified, the start-time and interval of time that the curtailment event will occur, the end-user contact's response to the curtailment notice, load data that allows the end-user or ESP to graph or statistically analyze curtailment performance, and calculated curtailment credits, if applicable.

The E1-2000 records 54 preferably include attributes for each E1-2000 4 assigned to end-user facilities. In the preferred embodiment, the E1-2000 records 54 include information that identities whether the E1-2000 4 is in a LAN or in a dial-up mode, the standard communication time interval, the stand-by communication time interval, the meter/pulse channel allocation, the pulse meter or device protocol, the meter multiplier coefficient, the polling time interval, and the Watermark rules, which include an upper and lower data limit validation value.

The end-user groupings 30 are records created by the ESP, preferably through the ESP CCC 26. The end-user groupings 30 comprise a collection of records that the ESP forms for load consolidation. The CCC interface allows the ESP to preferably group end-users by group name, available load, zip code or designated areas, notification lead times, or by selected trigger prices 56. The attributes of the ESP selectable groups 58 preferably include the end-users address, the amount of energy committed to curtailment, the notification lead time, the days available for load reduction, the hours available for load reduction, the available load, the trigger prices, and the method of curtailment, whether it be by a manual or an automatic method.

The curtailment decision matrix 32 includes Energy Price Exchange data 60 (such as data available from Cinergy or Nymex, for example), generation, Transmission & Distribution ("T&D"), and data that describes the availability of displaceable and curtailable end-user customer loads. The CCC 26 interfaces Energy Price Exchanges to obtain and display indexes of relative prices from selected exchanges or hourly spot market prices or future market prices from selected exchanges. These records provide information that allows end-users to anticipate curtailment events and provide ESPs with lead-times to issue curtailment notices.

Preferably, the curtailment decision matrix provides the ESP with end-user-profiling applications. In the preferred embodiment, these applications provide decision support information to the ESP interface 8 that allow ESPs to select end-users based on trigger prices 62, time and day constraints 64, and acquisition and/or cost constraints 66. In the trigger price application 62, the ESP can display and/or issue curtailment notices to end-user groups whose trigger price is less than or equal to hourly spot market prices or to anticipated market prices. Due to generation and T&D constraints, the ESP can display and/or issue curtailment notices to end-user customers based on the their respective curtailable loads and generators for load displacement. This application helps reduce substation and transformer stress caused by excessive time of day demand. The acquisition and cost constraint application 66 reduces the load requirements of an ESP by displaying and/or issuing curtailment notices to end-users based on their committed load reductions and/or their location or the location of a selected feeder line or other selectable components.

FIG. 4 illustrates how curtailment events are implemented. The process begins when an ESP is authorized 68. The management device 10 verifies the ESP's user identification and password before allowing access to the CCC 26 and the management device 10. Once the ESP is authorized, it selects the end-user or end-user customer group that will be subject to a curtailment event 70. Group selection may be based on previously defined groups, the energy available for curtailment, notification lead times, trigger price thresholds, the available time for curtailment, or any other criteria or record the ESP elects. After the end-user or group is selected, the ESP sets the curtailment parameters for the selected end-user or group 72. In the preferred embodiment, the ESP can designate the curtailment date, the curtailment start-time, the curtailment end-time, and enter an alphanumeric pager and/or facsimile and/or e-mail message. In alternative embodiments, the ESP can designate other CCC 26 fields.

After the curtailment parameters are selected, the ESP can elect a real curtailment 74, a test curtailment 76, or a customer warning notification mode 78. When the ESP elects a real curtailment 74, E1-2000 alarm(s) are activated and pager, facsimile, and e-mail messages ("unified messages") are sent to the end-user'(s) designated contact (s). If the end-user elected automatic control, the E1-2000 4 initiates load reductions through its relay ("digital") and analog voltage channels. If the end-user elected manual control, the end-user makes load reductions or activates its internal generators after the authorized contact commits to a curtailment. When the ESP elects a test curtailment 76, the ESP has the option of activating the E1-2000 alarm(s) and/or sending the unified messages. Under test curtailment mode 76, any notifications sent to the designated contact(s) will be preceded by a designated message such as "Test Curtailment." When the ESP elects a customer warning notification 78, E1-2000 alarm(s) are activated and unified messages are sent to the designated contact(s). However, like the test curtailment mode 76, no relay or analog voltage channels are activated.

In the preferred embodiment, the ESP can put an end-user or group also into a stand-by-mode 80. In a stand-by-mode 80, the management device 10 issues a ring instruction that causes the E1-2000 4 to connect to the management device 10. After the management device 10 and E1-2000 4 interface, the E1-2000 4 downloads an updated Configuration File that preferably causes the E1 2000 4 to call the management device 10 at a greater frequency until the E1 2000's 4 callback field is reprogrammed.

In the preferred embodiment, the curtailment monitor 36 shown in FIG. 4 allows the ESP to display the status of the end-user notification(s) and curtailment performance. Preferably, the status page 82 displays each end-user's name in curtailment by group(s), their load reduction commitments, the potential load reduction capacity, and their notification status. The notification status will indicate if the communication was acknowledged or if a commitment or a rejection was received by the management device 10 shown in FIG. 1.

In addition to displaying the status of the end-user's notification, the curtailment monitor 36 allows the ESP to set load trigger points and view load profile and load control information in a variety of user selectable formats including tables and graphs. Load trigger points are set to notify the ESP and end-user when the end-user is not in compliance with a projected or an agreed performance commitment. Curtailment performance 84 can be measured by selecting a performance table or graph that illustrates the end-user's forecasted and actual demand. The difference between these two sets of data is one measure of the end-user's curtailment performance.

As shown in FIG. 4, the preferred embodiment also provides a settlement module 38. The settlement module 38 determines end-user credits based on monitored load reduction performance. The end-user curtailment performance interface 86 is a collection of records that provides the ESP with information concerning Energy Price Exchange data, end-user identifications, the time(s) and date(s) of the curtailment event(s), and the actual and projected load reduction(s). End-user settlements can then be calculated in any preferred manner. As illustrated in FIG. 4, credits can be calculated 88 by evaluating load reduction performance and agreed price schedules.

FIG. 5 illustrates a block-diagram describing the end-user's curtailment notification and acknowledgement process 40, the end-user's identity and load management attributes 42, and the methods of implementing load management 44. An end-users curtailment notification and acknowledgement 40 begins when an ESP issues a curtailment request. An ESP sends out notification requests to selected end-user contacts individually or collectively by selection of curtailment group(s) 90. Designated end-user contact(s) receive notice through selected messaging or unified messaging or through E1-2000 alarms. When the end-user(s) receive a notice, a designated end-user contact logs onto an on-line Site through the ISP 12 and the customer or end-user interface 6 shown in FIG. 1. In the preferred embodiment, the on-line Site is located on the Internet 16 at Energy1st.com. After designated contact logs onto the Site by providing a valid username and password, the on-line Site immediately prompts the designated contact to acknowledge the curtailment request by either accepting or rejecting the request 92. An acceptance or rejection is then entered into the CCC 26 database, which can be accessed through the customer or end-user interface 6 or the ESP interface 8 by selecting the curtailment history. Preferably, end-user performance can be tracked by selecting any one of a user selectable performance tables or graphs that illustrates the end-user's actual demand 94. Depending on the E1-2000's 4 callback schedule, curtailment can be reviewed on a programmed time delay or in real-time.

Preferably, the end-user identity and load management records 42 include notification records 96, load reduction records 98, and historical curtailment records 100. The customer notification records 96 include fields for multiple contact names and addresses for selected or unified messaging. End-user load reduction records 98 include a listing of load reduction/displacement items, such as for example, generators, HVAC units, lighting controls systems, and building control systems that control other devices. These records preferably include attributes that describe projected kilowatt reductions, trigger prices (i.e. dollars/mega-watt hour), number of days, hours per day, and years a particular load or energy generating device can be subject to a curtailment event, notification lead times, the method of curtailment, whether curtailment will occur by a manual or an automatic method, and the method of control whether it be by E1-2000 4 relay or analog control channels. The method of control can further include fields identifying a designated relay for a relay control channel and its designated pulse width(s) and/or the designated analog channel (s), its interval limits, and its defined voltage steps.

The historical curtailment records 100 preferably include load curtailment information for current and historical curtailment notices, the dates of messaging including unified messaging, the amount of power committed for curtailment, the day and the time that the designated contact was notified, the designated contact's response, the calculated curtailment credits, and other end-user and ESP selectable data that can be tracked by an end-user or an ESP in a selectable table or graph format.

When end-users commit to a curtailment event, the end-user can reduce energy use manually or automatically with the assistance of the E1-2000 4. End-users' load reduction items 102 include any energy-consuming device that consumes power or generating device that provides power. Thus, load reduction occurs when an end-user turns off one or several elevator banks, electric pumps, electric furnaces, electric motors, electric chillers, or even reduces compressor loads on air conditioning units by setting thermostats to higher temperature setting, for example. Load reductions, for example, can also include turning off nonessential lighting or activating light dimmers or ballast controllers or can include activating end-user generators, turbines, or fuel cells. Any load reduction item 102, including the exemplary items described above, is tracked by the CCC 26 and can be part of an end-user curtailment program.

Preferably, there are at least two methods of curtailment 104, a manual method and an automatic method. A manual method occurs when dispensable loads are switched off-line or alternative energy supplies are utilized without using the E1-2000 4. An automatic method occurs through the E1-2000 4 which preferably utilizes standard interfaces such as an RS-232/RS-485 asynchronous serial communication port or other interfaces and/or its relay and analog voltage channels to switch loads off-line and/or activate alternative energy supplies.

Figure 6:
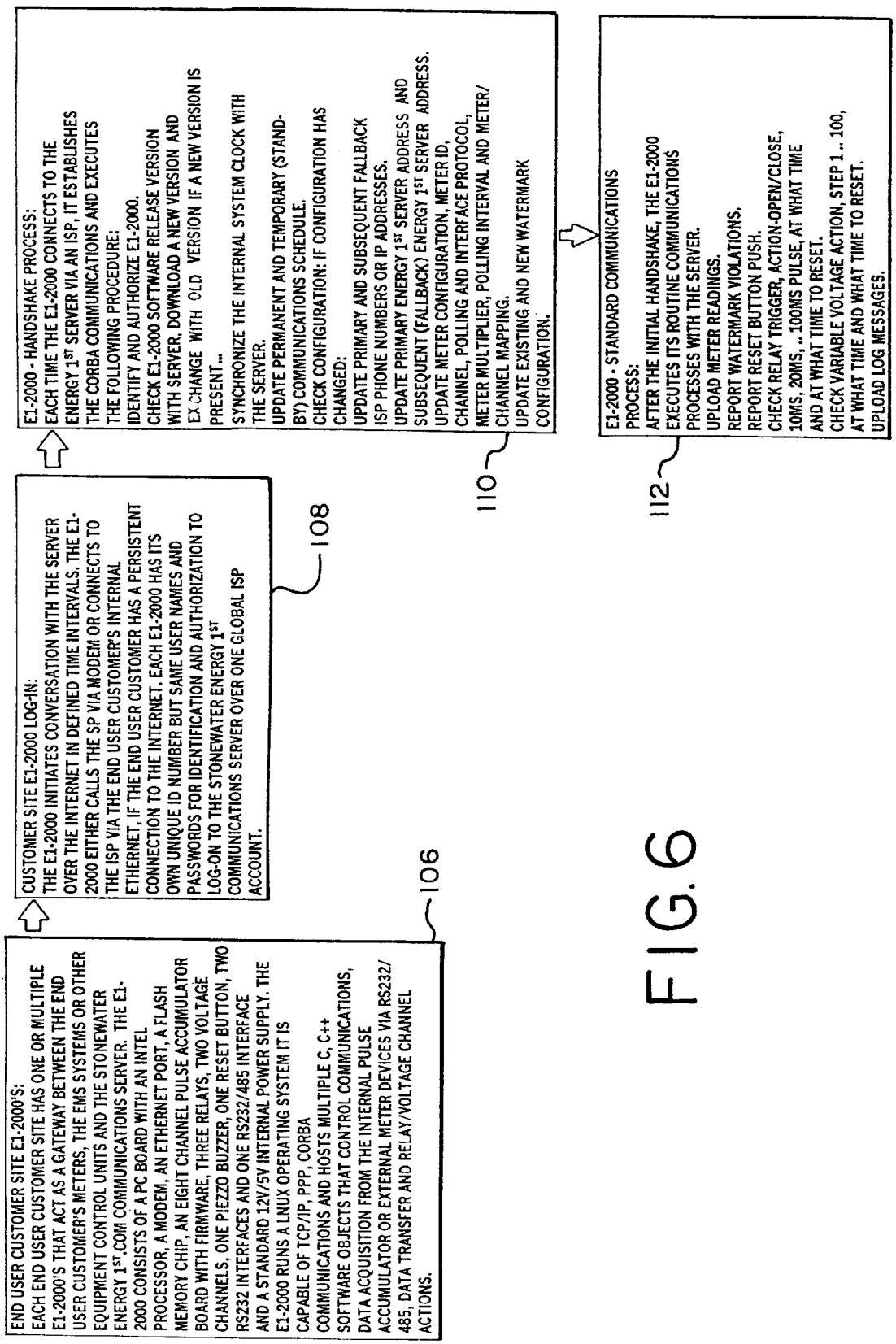
FIG. 6 is a flow-chart of the Energy1st-2000 of FIG. 2.

An exemplary detailed E1-2000 4 flowchart is illustrated in FIG. 6. The E1-2000 4 flowchart is broken up into four exemplary sections: Section 1 illustrates an E1-2000 4 overview; Section 2 illustrates a log-in process; Section 3 illustrates a handshake process; and Section 4 illustrates an E1-2000 4 communication process.

In Section 1 (106), an E1-2000 4 overview is illustrated. As shown, each end-user facility has one or multiple E1-2000s 4 that perform protocol conversions for the ISP 12 and the management device 10, data translations and conversions, and message handling. The E1-2000 4 preferably operates on a LINUX™ Operating System that controls the allocation and usage of hardware resources such as memory, processing unit time, and peripheral devices. The E1-2000 4 supports many types of communication protocols including for example Transmission Control Protocol/Internet Protocol ("TCP/IP") that governs the breakup of data streams into packets to be sent via the ISP 12, and the reassembly and verification of the complete messages from packets received by Internet Protocol ("IP"); Point-to-Point Protocol ("PPP") that provides protection for data integrity and security; and Common Object Request Broker Architecture ("CORBA") which works in object-oriented environments where portions of programs (objects) communicate with other objects in other programs, even when the programs are written in different programming languages and/or are operating on different software platforms. A CORBA program makes its request for objects through an Object Request Broker or ("ORB") and thus does not need to know the structure of the program that created the object. In the preferred embodiment, the E1-2000 4 is capable of hosting many objected orientated languages including Delphi and C++ programming languages, for example.

In Section 2 (108), the E1-2000 4 login process is illustrated. In Section 2, the E1-2000 4 interfaces the management device 10 through the ISP 12 continuously or at defined time intervals. Each E1-2000 4 connects to the management device 10 through the ISP 12 through either a modem or a LAN. In the preferred embodiment, a LAN sustains continuous connections. In alternative preferred embodiments, either a LAN or a modem sustains continuous or periodic connections. Preferably, each E1-2000 4 possess a unique identification code and share a common user name and password to interface the management device 10 and on-line Site through one global ISP 12 account. However, in alternative preferred embodiments the E1-2000 4 possess unique identification codes, user names, and passwords as a security measure.

In Section 3 (110), the E1-2000 4 initial handshake process is illustrated. In Section 3, the E1-2000 4 first interfaces the management device 10 and connects to an on-line Site through the ISP 12. Preferably, the E1-2000 establishes a CORBA communication link before identifying itself and its current Application Software version. The E1-2000 4 then validates its Application Software and synchronizes its internal clock. After synchronizing its clock, the E1-2000 4 preferably executes a number of initial administrative tasks, including: updating its permanent and stand-by communication schedule, assuring its Configuration File, updating its primary and fallback ISP 12 phone numbers and/or its Internet provider addresses, updating its primary and secondary one-line Site addresses, updating its meter configurations, meter identifications, E1-2000 4 meter channel assignments, autopolling intervals, and meter/channel memory maps.

In Section 4 (112), a standard E1-2000 4 connection process is illustrated. After the initial handshake process is complete the E1-2000 4 executes its programmed communication process with the management device 10. As previously described, the E1-2000 4 first identifies itself through its unique identification code. The management device 10 compares this code against a stored list of authorized E1-2000 4 codes. When the code is validated, the management device 10 allows the E1-2000 4 access. The E1-2000 4 then validates its Application Software and synchronizes its internal clock with the system clock of the management device 10. After its clock is synchronized, the E1-2000 4 uploads each of its individual meter or device readings, which are validated by the management device 10 and then stored in the CCC 26 database. If any Watermark violations occurred since the last E1-20004 interface, these violations are uploaded, validated, and entered in the CCC 26 database. The E1-2000 4 next downloads its callback connection schedule and validates its Configuration File. In the preferred embodiment, when the Configuration File is updated the callback connection field is updated as well. If any curtailment instructions were entered at the on-line Site or sent directly to the management device 10 by the ESP interface 8, the E1-2000 4 downloads curtailment notification instructions before clearing expired or uploaded data, logging off of the management device 10, and disconnecting from the ISP 12.

FIG. 7 illustrates a preferred embodiment of the management device 10. The management device 10 is a controller or program that responds to commands from the E1-2000 4, the customer or end-user interface 6, the ESP interface 8, and an administrative interface 122. Preferably, the management device 10 operates in a time-sharing environment of data management, information sharing between ESPs, end-users, Energy Price Exchanges, E1-2000's 4, and other peripheral user interfaces and devices and provides sophisticated network administrative and security features including Firewalls and ring instructions. In the preferred embodiment, the management device 10 comprises a control device 234 that interfaces the network access device through a distributed network and further supports an on-line Site that comprises a communication service 116, an information service 118 such as the CCC 26 database service, and a distributed network service 120. In the preferred embodiment, the distributed network service 120 is a Web Application Service that arranges text, images, and buttons to be read and utilized by Internet users all across the world.

As shown in FIG. 7, the management device 10 supports an on-line Site that supports three service elements. Each service element resides on one or more servers that preferably are supported by secondary servers that are connected to a separate access provider such as an ISP 12 then the primary servers they backup and support. The secondary servers mirror the primary servers in their services and functionality.

The communication service 116 is preferably a server-side device that allows the E1-2000s 4 to seamlessly interface a control device 284 shown in FIG. 1. The control device 284 is a circuit, software or any other device, system, or code that connects hardware or platforms so that information can be moved from place to place. Preferably, the communication service 116 supports TCP/IP, PPP, and CORBA communication protocols. The communication service 116 supports many other communication protocols in alternative preferred embodiments including Serial Line Internet Protocol ("SLIP") communication protocol, for example. Moreover, the communication service 116 can provide a secure connection between devices meaning the information end-user, E1-2000 and ESP interfaces 6, 4, and 8 provide, such as energy curtailment goals and real-time demand, can be encrypted so that it cannot be read or intercepted by unauthorized devices or users. Preferably, the database service 118 is also a server-side device. In the preferred embodiment, the database service 118 comprises a server that supports a relational database that has OLE capabilities that stores information in tables—rows and columns of data. The rows of the table represent records and the columns represent fields. The database allows searches to be conducted in which the database matches information from a field in one table with information in a corresponding field of another table to produce a third table that combines requested data from both tables in a high-resolution graphic or table format. In other words, the preferred database uses values from multiple fields to relate information to other fields.

Preferably, the Web Application service 120 hosts all end-user and ESP related interfaces 6 and 8 and functions that are accessible through the customer or end-user interface 6, the ESP interface 8, and the administrative interface 122. It further comprises a group of related text files that contain not only Hypertext Markup Language ("HTML") and Extensible Markup Language ("XML") tags as in standard Internet documents, but also can contain commands, written in scripting language such as Visual Basic Script ("VBScript") that can be executed by the servers. The Web Application service 120 enables end-users and ESP's to customize the viewing, delivery, and exchange of information through standard Uniform Resource Locators ("URL") through Web browsers, such as Microsoft Internet Explorer™ or Netscape Navigator™, for example.

FIGS. 8–24 illustrate the Graphical User Interfaces ("GUI") that represent programs, files, and end-user and ESP options by means of icons, menus, and dialog boxes. The user can activate these options by pointing and clicking a mouse, entering a keyboard command, or using many other communication devices. All of the icons, menus, and dialog boxes function the same way across many software platforms, because the GUI provides standard software routines that make these functions compatible with many URLs. Other network connections are provided in alternative preferred embodiments including command-line-interfaces and menu-driven interfaces. A command-line-interface is an interface that allows users to enter commands. A command-line-interface can be considered more difficult to use than GUIs because they are programmable interfaces. Menu-driven interfaces can also be considered easier to use than command-line-interfaces as these interfaces provide menus of all available user choices and options.

FIG. 8 illustrates an exemplary start-page of the on-line Site. This page is accessible through the Internet 16 and serves to welcome users, provide information about the Site, and direct the users to energy information, rate analysis, management of loads and energy supplies, and set up modifications after the end-user or ESP logs on to the on-line Site using their usernames and passwords. In other words, this page functions as a table of contents of the Site. A brief overview of the ESP accessible pages is described below.

After an ESP selects Energy Info, the on-line Site directs the user to FIG. 9. FIG. 9 illustrates an exemplary address dialog-box. As shown, Accounts 124 is a menu-driven field that allows ESPs to view existing accounts or add new accounts to the Site. This page preferably records address and telephone data. FIG. 10 illustrates an exemplary contact dialog-box that solicits the designated contact's addresses. These fields preferably include primary and secondary pager access numbers 126 and 128, a facsimile number 132, and e-mail or net address(es) 130.

FIG. 11 illustrates an exemplary load summary dialog-box. The exemplary load-summary dialog-box preferably displays a summary of reduction/displacement items 148 that can be updated by a click of a mouse. The exemplary load-dialog-box preferably includes reduction/displacement item attributes that indicate if the items are active 134, the kilowatt reduction 136, the trigger method whether it be manual or method 138, the notification lead times 140, the days each item is available in the season 142, the hours per day 144, and the trigger price 146.

FIG. 12 illustrates an exemplary option dialog-box. The exemplary option dialog-box allows the ESP to identify the E1-2000 4 and its associated peripheral load(s) or generator (s) that are referred to as items 150. It further includes attributes on each item that preferably includes kilowatt reductions 152, a trigger price 154, the days per year 156, hours per day 158, notification lead time in minutes 160, and whether the item is activated and/or deactivated by the analog and/or relay controlled ("digital") voltage channels 162–168.

FIG. 13 illustrates an exemplary end-user forecast. The end-user forecast is selectable by customer and date and preferably provides an hourly forecast of expected energy use in kilowatts.

FIG. 14 illustrates an exemplary communication summary. The communication summary preferably summarizes the curtailment date 170, whether a unified message or selected message was sent 172, the amount of energy committed for curtailment 174, the date and time the end-user contact was notified 176, the expected curtailment time 178, and the end-user's contact response to the curtailment notification 180.

FIG. 15 illustrates an exemplary E1-2000 4 dialog-box describing a HVAC interface assigned to an exemplary zone. FIG. 15 shows all of the definable fields of an interface, which includes the device assignment or owner 182, the type of device or name 184, the zone identification 186, the communication line access field and telephone number 190 and 192, the password 194, the MAC address 196, the communication minutes of the device 198, the temporary communication minutes 200, a description of the device 204 and a list of user selectable options 206.

FIG. 15 further illustrates exemplary meter attributes. It illustrates the zone identifications of multiple standard meters 208, their respective accumulator channel assignments 218, their alias 210, the type of meter 212, their autopolling intervals 216, and their multipliers. Because the aggregate pulse count of the exemplary standard meter of FIG. 15 is proportional to the total watt-hours tracked by the meter, a multiplier field is provided which allows the management device 10 to calculate the precise amount of energy monitored by the meter. As illustrated, the total watt-hours tracked by the exemplary standard meter of FIG. 15, is directly proportional to the aggregate pulse count of the standard meter and thus the multiplier is one. In alternative preferred embodiments, the multiplier can be any real number that when multiplied by the aggregate pulse count calculates the total watt-hours consumed by the device.

FIG. 16 illustrates an exemplary log of an exemplary zone. Besides identifying the date 220 and time 224 of the communication between the E1-2000 4 and management device 10 it also provides a status message 226 indicating the condition of the communication link.

FIG. 17 illustrates an exemplary E1-2000 dialog box assigned to another exemplary zone. It identifies the alias 210, the type of device 212, the multiplier 214, the autopolling interval 216 in minutes, and a list of user selectable options 206.

FIG. 18 illustrates an exemplary Watermark dialog-box of the exemplary zone. In the preferred embodiment, the Watermark dialog-box includes the type 228, which identifies Hi, LO, EQ, and LONZ fields, the limits for these respective fields 230, and whether the Watermark zone is active 232 or suspect 234. A summary of recent Watermark violations is also illustrated which identifies the rule 236 that was violated, the timestamp 238, the kilowatt reading that caused the violation 240, and whether the management device 10 was notified 242 of the violation.

Figure 19:
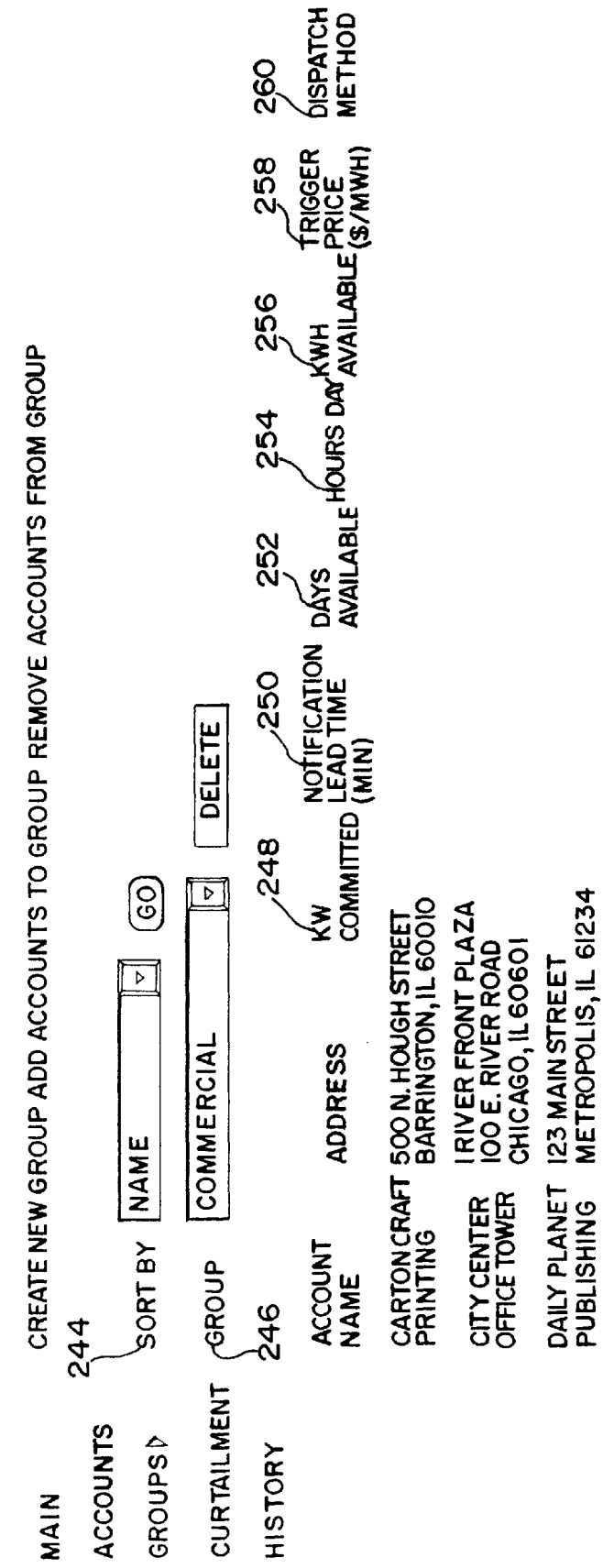
FIG. 19 is an exemplary application function of FIG. 1.

FIG. 19 illustrates an exemplary application function. As shown, the ESP can sort by end-user names 244 or by ESP definable groups 246. Each end-user selected by name or by groups can be displayed with the number of kilowatts they committed to curtailment 248, their respective notification lead times 250, the days the commitments are available 252, the hours per day 254, the total kilowatts available 256, the trigger price 258, and the communication or dispatch method 260, whether it be by alarm or messaging.

FIG. 20 illustrates an exemplary start-page dialog-box of the curtailment system.

An ESP must provide a valid username and password before being granted access.

FIG. 21 illustrates an exemplary application function for the curtailment system. As shown, the ESP can sort by end-user names or ESP definable groups. ESP selectable fields can further define each end-user. These fields preferably include energy use 264, available power for curtailment 266, minimum or maximum lead times 268, and curtailment duration intervals 270.

FIG. 22 illustrates the exemplary message initiation functions. As shown, the ESP can customize its unified messaging and schedule their dispatch.

Figure 23:
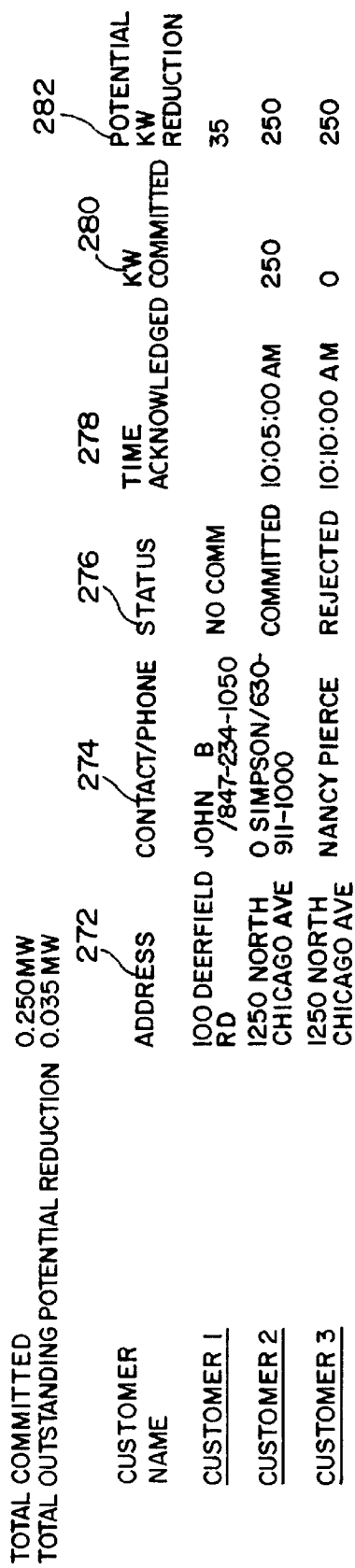
FIG. 23 is an exemplary curtailment notification/acknowledgement status summary of FIG. 20.

FIG. 23 illustrates an exemplary curtailment notification/acknowledgement status summary. The summary includes end-user addresses 272, designated contacts 274, curtailment notification status 276, the time of acknowledgement 278, their kilowatts committed 280, and the end-user's potential kilowatt reductions 282.

Figure 24:
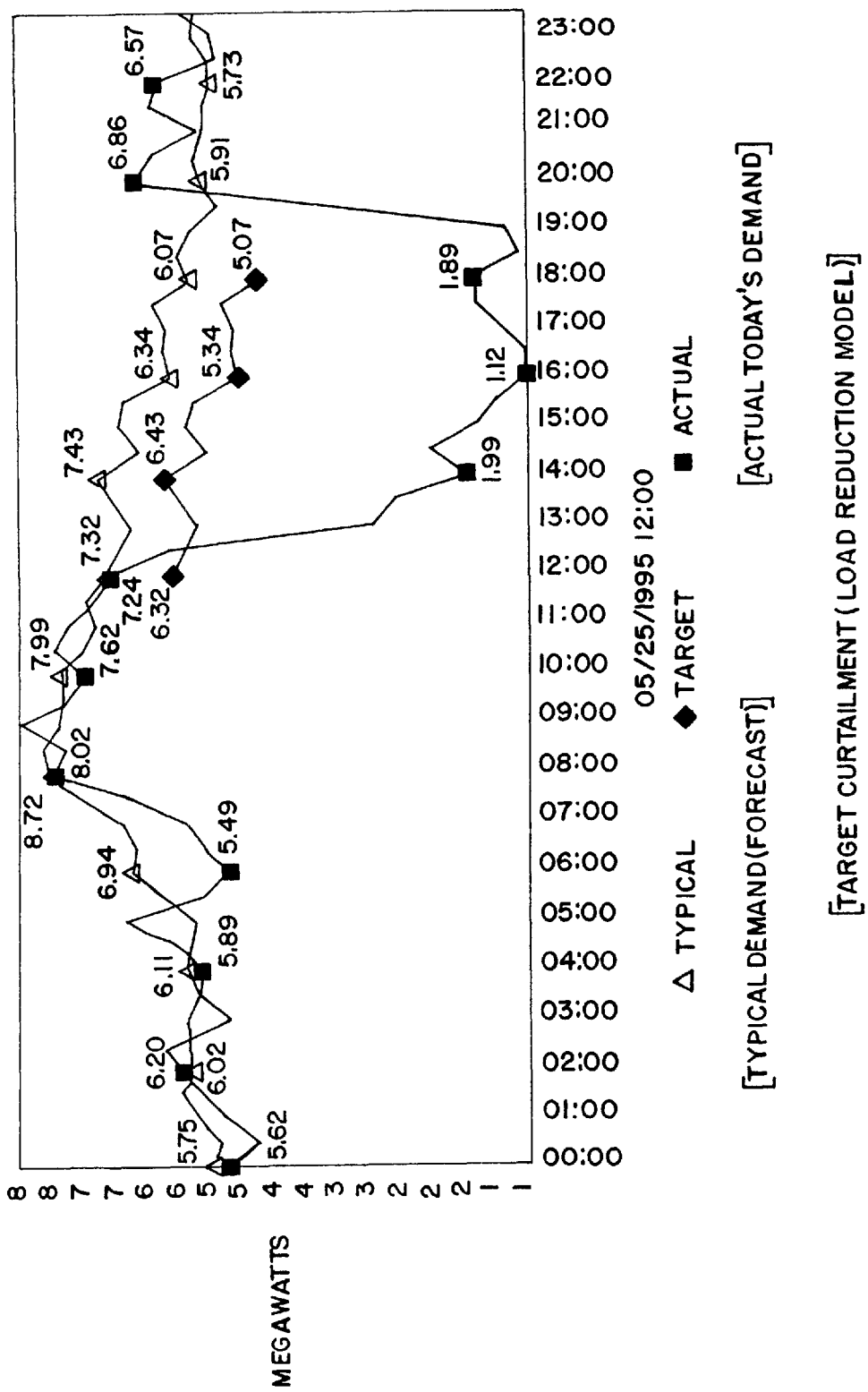
FIG. 24 is an exemplary user-defined graphic of FIG. 1.

FIG. 24 illustrates an exemplary user-defined graphic. As shown, incremental kilowatt load forecast data over twenty four-hour periods is graphed against actual demand. The difference between these graphs is one measure of the end-user's curtailment performance.

From the foregoing description is should be apparent that the system and method of the present invention facilitates energy redistribution and trade initiated by ESPs in response to energy market conditions and time and day constraints. The invention provides monitoring, control, and analysis of load profiles and energy market prices that cover a large number of distributed end-users. One preferred embodiment of the invention relies on the infrastructure of the Internet utilizing a star topology and TCP/IP and CORBA protocols. The CORBA protocol streamlines the communication between end-users, ESPs and E1-2000s 4 with the management device 10 and on-line Site thus enabling a large number of users to report to one management device 10 or a single server. Moreover, one preferred embodiment monitors multiple power consuming devices at decentralized locations to initiate load-shedding processes and also utilizes end-users generation capacity for load displacement, initiating manual and automatic load reduction plans using unified messaging, and can make unutilized energy available for resale on the spot or open market through its interface(s) to Energy Price Exchanges.

The foregoing description has described only a few of the many forms that the invention can take, and should therefore be taken as illustrative rather than limiting. It is only the following claims, including all equivalents, which are intended to define the scope of the invention.

What is claimed is:

1. A system for monitoring and controlling energy distribution from at least one Energy Service Provider, comprising:

a publicly accessible distributed network;

a network access device that interfaces power monitoring and power curtailment circuitry to said distributed network; and a management device that supports interfaces to said power monitoring and said power curtailment circuitry, said management device located remotely from said network access device, and comprising a control device that interfaces said network access device through said publicly accessible distributed network, wherein said management device controls electrical loads at a remote location based in part on market prices of electricity;

wherein said network access device comprises a plurality of E1-2000s located remotely from said management device.

2. The system of claim 1 wherein each of said Internet Customer Curtailment Modules share a common identification code that allows said Internet Customer Curtailment Modules to interconnect with said publicly accessible distributed network through a single service provider account.

3. A system for monitoring and redistributing energy, comprising:

a publicly accessible network;

an energy exchange interfaced to said publicly accessible network;

an E1-2000 interfaced to power monitoring circuitry, power curtailment circuitry and said publicly accessible network;

an on-line Site interfaced to said E1-2000 and said energy exchange through said publicly accessible network, said on-line Site facilitating energy redistribution by monitoring power consumption data through said E1-2000, price data through said energy exchange, and initiating curtailment events through said E1-2000.

4. The system of claim 3, wherein said E1-2000 comprises software and said on-line Site interface to said E1-2000 is a periodic interface controlled by said software.

5. The system of claim 3, wherein said E1-2000 comprises a modem and an Ethernet device and said on-line Site interface to said E1-2000 occurs through one of said modem and said Ethernet device.

6. The system of claim 3, wherein said E1-2000 comprises a wireless device and said on-line Site interface to said E1-2000 occurs through said wireless device.

7. The system of claim 3, wherein said on-line Site comprises a communication server, a database server, and a Web application server.

8. The system of claim 7, wherein each of said communication, database, and Web application servers further comprise secondary servers that backup each of said communication, database, and Web application servers.

9. The system of claim 3, wherein said publicly accessible network is the Internet.

10. The system of claim 3, wherein said E1-2000 is a programmable device can be programmed through said on-line Site.

11. The system of claim 3, wherein said E1-2000 is responsive to a ring instruction.

12. The system of claim 3, further comprising an end-user interface, an energy supplier interface, and an administrative interface wherein each of said interfaces are located remotely from one another.

13. The system of claim 3 wherein said on-line Site interface to said E1-2000 is a continuous interface that allows said on-line Site to monitor price data and power consumption data in real-time.

\* \* \* \* \*

UNITED STATES PATENT AND TRADEMARK OFFICE
CERTIFICATE OF CORRECTION

PATENT NO.      : 6,519,509 B1
DATED           : February 11, 2003
INVENTOR(S)     : Gerd W. Nierlich et al.

It is certified that error appears in the above-identified patent and that said Letters Patent is hereby corrected as shown below:

<u>Title page,</u>
Item [56], References Cited, OTHER PUBLICATIONS, delete "p. 4" and substitute -- p. 57 -- in its place.

Signed and Sealed this

Fourth Day of November, 2003

JAMES E. ROGAN
*Director of the United States Patent and Trademark Office*